(12) United States Patent
Nishimura

(10) Patent No.: US 7,126,658 B2
(45) Date of Patent: Oct. 24, 2006

(54) LIQUID CRYSTAL DISPLAY DEVICE AND ELECTRONIC APPARATUS HAVING PARTICULAR DOT REGIONS

(75) Inventor: Joji Nishimura, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 179 days.

(21) Appl. No.: 10/808,565

(22) Filed: Mar. 25, 2004

(65) Prior Publication Data
US 2004/0218122 A1    Nov. 4, 2004

(30) Foreign Application Priority Data
Apr. 21, 2003  (JP)  ............... 2003-116364
Feb. 6, 2004   (JP)  ............... 2004-031060

(51) Int. Cl.
G02F 1/1335    (2006.01)
G02F 1/1337    (2006.01)

(52) U.S. Cl. .................. 349/114; 349/129; 349/130

(58) Field of Classification Search ............ 349/114, 349/130, 129
See application file for complete search history.

(56) References Cited

U.S. PATENT DOCUMENTS

| | | | |
|---|---|---|---|
| 6,707,519 B1 * | 3/2004 | Okumura et al. | 349/114 |
| 6,753,939 B1 * | 6/2004 | Jisaki et al. | 349/114 |
| 6,816,217 B1 * | 11/2004 | Sone | 349/114 |
| 6,894,745 B1 | 5/2005 | Fujimori et al. | |
| 6,900,863 B1 * | 5/2005 | Okamoto et al. | 349/114 |
| 6,924,876 B1 * | 8/2005 | Kubo et al. | 349/193 |
| 2002/0080320 A1 | 6/2002 | Suzuki | |

FOREIGN PATENT DOCUMENTS

| | | |
|---|---|---|
| JP | A 7-28063 | 1/1995 |
| JP | A 11-258606 | 9/1999 |
| JP | A 2001-42332 | 2/2001 |
| JP | A 2001-154200 | 6/2001 |
| JP | A 2001-272674 | 10/2001 |
| JP | A 2002-287158 | 10/2002 |
| JP | A 2002-350853 | 12/2002 |
| JP | A 2002-075839 | 3/2003 |
| KR | 2002-0015228 | 2/2002 |

OTHER PUBLICATIONS

Jisaki et al. "Development of transreflective LCD for high contrast and wide viewing angle by using homeotropic alignment", Asia Display/IDW '01 pp. 133-136.

* cited by examiner

Primary Examiner—Andrew Schechter
Assistant Examiner—Mike Qi
(74) Attorney, Agent, or Firm—Oliff & Berridge, PLC

(57) ABSTRACT

To provide a transflective liquid crystal display device capable of obtaining a display with high brightness, high contrast, and wide viewing angle, a liquid crystal display device including a liquid crystal layer sandwiched between a pair of substrates, the liquid crystal layer having liquid crystal having negative dielectric anisotropy whose initial alignment state exhibits a vertical alignment; and a plurality of dot regions arranged in an image display region, each of the dot regions being provided with a transmissive display region to perform transmissive display and a reflective display region to perform reflective display therein, the transmissive display regions or the reflective display regions of two adjacent dot regions P1, P2 provided at positions facing edges of the respective dot regions and the liquid crystal aligned obliquely in reverse directions to each other by a transverse electric field which is generated at each edge when a voltage is applied.

8 Claims, 19 Drawing Sheets

LIQUID CRYSTAL DISPLAY DEVICE AND ELECTRONIC APPARATUS HAVING PARTICULAR DOT REGIONS

BACKGROUND OF THE INVENTION

1. Field of Invention

The present invention relates to a liquid crystal display device and an electronic apparatus, and more specifically, to a technology capable of obtaining a display with high brightness, high contrast and wide viewing angle, in a transflective liquid crystal display device where display is performed in both transmissive and reflective modes.

2. Description of Related Art

A liquid crystal display device has been proposed where external light is used in a bright place similar to a reflective liquid crystal display device and where an internal light source, such as a backlight, is used in a dark place to make the display visible. This liquid crystal display device adopts both reflective and transmissive display modes, and is configured to reduce power consumption by switching the display mode to either of the reflective and transmissive modes depending on the surrounding brightness. It can produce a clear display even in dark surroundings and is suitable for the display of a portable apparatus. Hereinafter, such a liquid crystal display device is referred to as a "transflective liquid crystal display device" in the present specification.

As such a transflective liquid crystal display device, a liquid crystal display device has been proposed in the related art in which a liquid crystal layer is sandwiched between an upper substrate and a lower substrate and a reflecting film in which an opening for light transmission is formed of a metal film, such as aluminum, is also provided on the inside of the lower substrate so as to function as a transflector. In the reflective mode, external light incident from the upper substrate side passes through a liquid crystal layer and then reflects on the reflecting film of the inside of the lower substrate and then passes through the liquid crystal layer again and emits from the upper substrate, thereby contributing to display. In the transmissive mode, light from the backlight incident to the lower substrate passes through a liquid crystal layer from the opening of the reflecting film and then emits from the upper substrate to the outside, thereby contributing to the display. Therefore, in the forming region of the reflecting film, the region in which an opening is formed is a transmissive display region, and the remaining region is a reflective display region.

However, a related art transflective liquid crystal display device has a problem in that the viewing angle is narrow in the transmissive display. This is because the reflective display uses only a single sheet of polarizer on the observers side since a transflector is provided on the inner plane of a liquid crystal cell so that parallax does not occur, thereby reducing the degree of freedom in the optical design. In order to address this problem, a transflective liquid crystal display device using a vertical alignment liquid crystal has been proposed in Japanese Unexamined Patent Application Publication No. 2002-350853. Its characteristics are as follows:

(1) A "VA (vertical alignment) mode" is employed where a liquid crystal having negative dielectric anisotropy is aligned vertically to a substrate and is inclined by the application of voltage.

(2) A "multigap structure" is employed where a transmissive display region and a reflective display region are different in liquid crystal layer thickness (cell gap) from each other.

(3) The transmissive display region is a regular octagon or a circle with a protrusion in the center of the transmissive display region on the counter substrate so that the liquid crystal is isotropically inclined within this region. In other words, an "alignment division structure" has been employed.

In a color liquid crystal display device of the transmissive type, there is a related art method known to realize a wide viewing angle as multi-domains are implemented by providing alignment control means such as various forms of electrode slits, protrusions, etc. employing a VA mode. See Japanese Unexamined Patent Application Publication No. 7-28063, Japanese Unexamined Patent Application Publication No. 11-258606 and Japanese Unexamined Patent Application Publication No. 2001-154200.

SUMMARY OF THE INVENTION

Since it is difficult to completely incline the liquid crystal in the portions controlling the alignment of electrode slits or protrusions, there has been a problem that causes the transmittance to go down. This problem complicates the alignment control and if the area occupied by the slits and the protrusions increases, it is even more significantly difficult. Also, it is difficult to machine the electrode slits if the slit is formed on the array substrate in which the multigap structure is formed, causing problems, such as disconnections, etc.

The present invention address these problems. Accordingly, where the residual image is a problem in a transflective liquid crystal display device the present invention provides a liquid crystal display device capable of controlling display defects, such as residual images and the like and obtaining high brightness and high contrast.

In order to achieve the above, an aspect of the present invention provides a liquid crystal display device including a liquid crystal layer sandwiched between a pair of substrates, the liquid crystal layer being composed of liquid crystal having negative dielectric anisotropy whose initial alignment state exhibits a vertical alignment; and a plurality of dot regions arranged in an image display region, each of the dot regions being provided with a transmissive display region to perform transmissive display and a reflective display region to perform reflective display therein, the transmissive display regions or the reflective display regions of two adjacent dot regions being provided at positions facing edges of the respective dot regions and the liquid crystal being aligned obliquely in reverse directions to each other by a transverse electric field which is generated at each edge when a voltage is applied.

According to an aspect of the present invention, when the region between the dots in which electrodes are not formed is considered to be a related art electrode slit, the alignment of the liquid crystal is controlled by actively using the transverse electric field generated at the dot edge when a voltage is applied. Here, the transmissive display regions or the reflective display regions of adjacent dot regions are aligned obliquely in the reverse directions by the transverse electric field generated at each edge when a voltage is applied, thereby realizing an alignment division between the two dot regions.

Specifically, since a similar grayscale display is performed in the two adjacent dot regions, they can be handled as a dot region (which is defined as a group region in the present specification to differentiate it from the original meaning of the dot region). But the viewing angle can be enhanced as the liquid crystal within the group region is aligned and divided by the above-mentioned method. Also, since the present configuration does not form the electrode slits, the protrusions, etc. as disclosed in Japanese Unexamined Patent Application Publication No. 7-28063, Japanese Unexamined Patent Application Publication No. 11-258606 and Japanese Unexamined Patent Application Publication No. 2001-154200, the aperture ratio is increased. Therefore, a display with high brightness and high contrast can be obtained. Also, the "adjacent" described above includes a case where the dot region is adjacent to, top and bottom, and to, left and right, sides and a case where the dot region is adjacent to the transverse direction.

In order to implement the alignment division through the two dot regions as such, for example, the transmissive display regions or the reflective display regions of the two adjacent dot regions may be opposed to each other so as to sandwich a region between these dot regions. In this configuration, the liquid crystal molecules between the opposite transmissive display regions or between the opposite reflective display regions are aligned obliquely in reverse directions by a transverse electric field generated at the edge of each adjacent dot region. As a result, the two domains having different tilt directions are formed within a single group region, thereby obtaining a display with an enhanced viewing angle.

Also, in order to implement the alignment division structure, for example, the transmissive display regions or the reflective display regions of the two adjacent dot regions may be opposed to each other at a left position and a right position with respect to a direction which the dot regions are adjacent to each other. In this configuration, the tilt direction of the liquid crystal is in the inverse direction in the transmissive display region (or the reflective display region) provided at the edge positioned at the left with respect to the direction in a dot region, and in the transmissive display region (or the reflective display region) provided at the edge positioned at the right with respect to the direction in the other dot region. Thereby, the alignment division can be implemented between the transmissive display regions or reflective display regions, giving a display with wide viewing angle.

Also, in each configuration mentioned above, a liquid crystal layer thickness-adjusting layer to control the thickness of the liquid crystal layer so as to be different in the reflective display region and the transmissive display region is preferably formed at least on the reflective display region between at least one of the pair of substrates and the liquid crystal layer.

From the above-mentioned configuration, by the existence of the liquid crystal layer thickness-adjusting layer provided so as to protrude toward the liquid crystal layer, since the thickness of the liquid crystal layer of the reflective display region can be thinner than that of the transmissive display region, the retardations of the reflective display region and the transmissive display region can substantially approach each other, or become substantially identical, thereby enhancing the contrast. In particular, if an inclined plane is provided at the liquid crystal layer thickness-adjusting layer to continuously change its own film thickness, by giving a pre-tilt to the liquid crystal molecules near the inclined plane, the declination to be generated disorderly can be reduced or prevented, thereby realizing a clear display with relatively smaller rough deposits.

Also, in the above-mentioned configuration, the dot region is formed in a substantially rectangular shape, and the transmissive display region is preferably arranged along the long edge of the dot region. As such, the alignment confining force can be increased as the proportion of liquid crystal molecules facing the dot edge is increased. In particular, in the transflective liquid crystal display device, since it requires high quality in the reflective display more than in the transmissive display, at least the transmissive display region may be arranged at the edge of the long side.

Specifically, the liquid crystal layer thickness-adjusting layer is provided along three edges of a substantially rectangular dot region to form a U-shape in plan view, and the transmissive display region is arranged along the other one edge thereof, thus realizing the above-mentioned configuration. In this case, since the liquid crystal molecules of the transmissive display region face only one edge of the dot region, there is hardly any alignment disclination, when compared, for example, with the case where the liquid crystal molecules face both edges of the long and short sides which have different alignment confining directions. Also, the liquid crystal layer thickness-adjusting layer is formed at the dot center, and the transmissive display region may be provided at four places being disposed along the four edges of a substantially rectangular dot region. In this case, four domains having different tilt directions can be formed within a dot region, thereby obtaining a display in which viewability is enhanced.

Also, if high quality is required in the reflective display, the transmissive display region is provided along three edges of the rectangular dot region to form a U-shape in plan view. The liquid crystal layer thickness-adjusting layer may be provided along the other one edge thereof. As such, the alignment confining force can be increased, as the proportion of liquid crystal molecules of the reflective region facing the dot edge is increased. Also, the liquid crystal layer thickness-adjusting layer is provided at four places being disposed along the four edges of a rectangular dot region. The transmissive display region may be provided at the dot center. In this case, four domains having different tilt directions can be formed within a dot region, thereby obtaining a display in which viewability is enhanced.

Also, a liquid crystal display device according to an aspect of the present invention employs a vertical alignment mode, and the structure is not particularly limited, but may employ any simple matrix and active matrix types. Also, a color filter for color display may be provided within any one of a pair of substrates.

An electronic apparatus according to an aspect of the present invention is characterized by including a liquid crystal display device mentioned above. According to such a configuration, it is possible to provide the electronic apparatus having the liquid crystal display portion with high brightness, high contrast and wide viewing angle, regardless of the environment in which it is used.

DETAILED DESCRIPTION OF EXEMPLARY EMBODIMENTS

First Exemplary Embodiment

Hereinafter, the first exemplary embodiment of the present invention will be described in detail with reference to FIGS. 1 to 5. The following drawings are shown in different scales for each layer or member for clarity. Also, in the present specification, a surface on the liquid crystal layer side in each member composed in the liquid crystal display device is referred to as the "inner surface" and the surface on the opposite side is referred to as the "outer surface".

Figure 1:
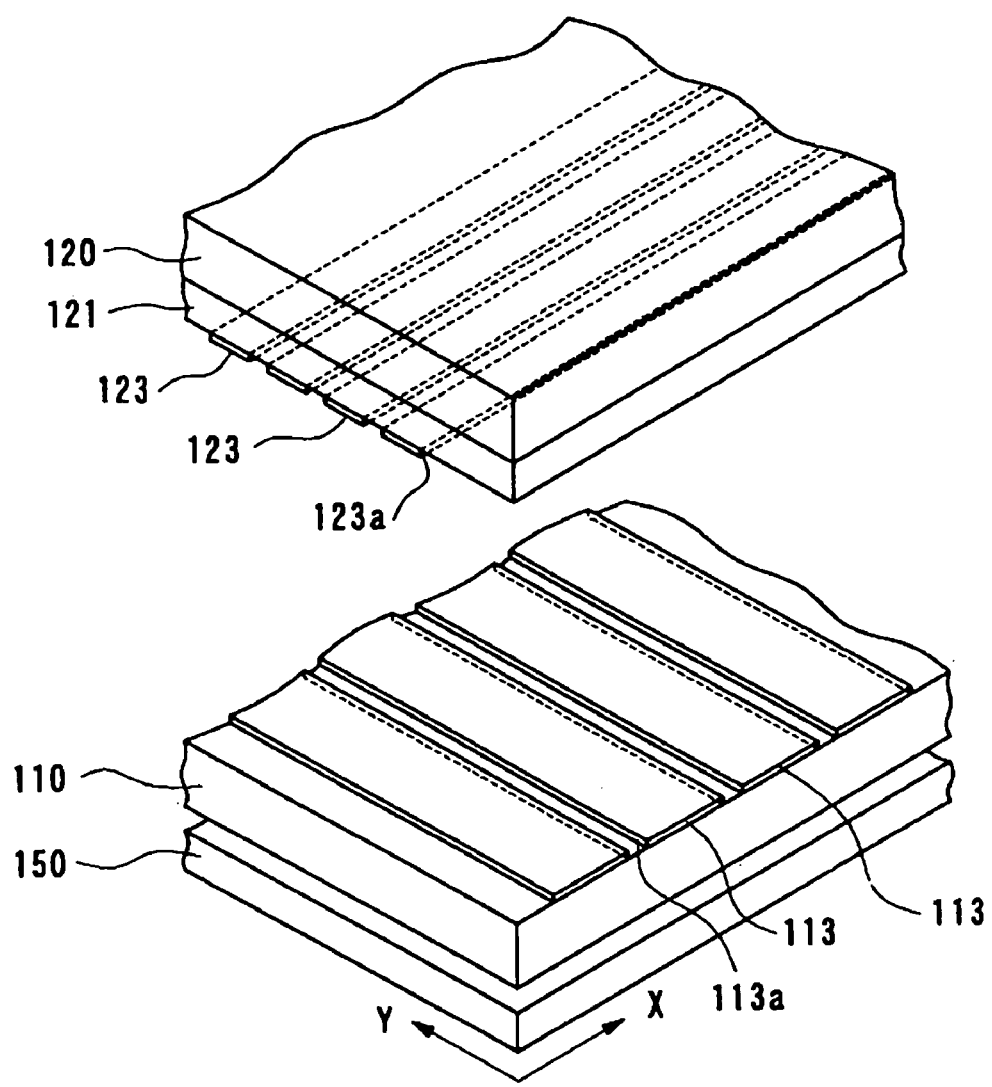
FIG. 1 is a schematic of a liquid crystal display device according to the first exemplary embodiment of the present invention.
Figure 2:
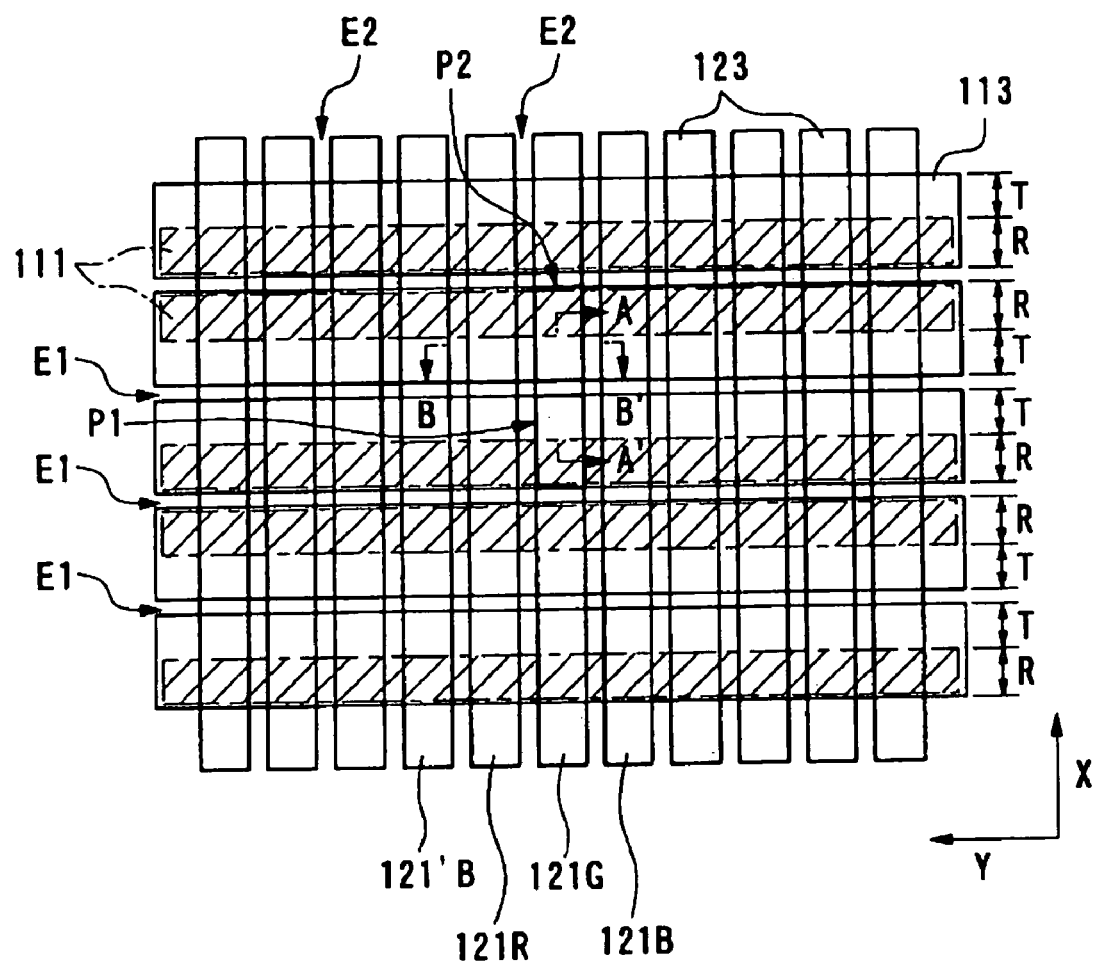
FIG. 2 is a schematic of a primary part of the liquid crystal display according to the first exemplary embodiment of the present invention.

First, the configuration of the liquid crystal display device according to the first exemplary embodiment of the present invention will be explained below, referring to FIGS. 1 and 2.

The liquid crystal display device of the first exemplary embodiment of the present invention is a simple matrix type liquid crystal display device. Each of electrodes 113 and 123 formed in a stripe is plurally arranged on each of substrates 110 and 120. Each of the electrodes 113 and 123 is serially provided in X- and Y-directions, respectively, and a dot region is formed by a substantially rectangular region in which the electrodes cross. An image display region is formed as a plurality of the dot region are arranged in a matrix. Also, as shown in FIG. 2, a region between the electrodes 113 is referred to as a symbol E1, and the region between the electrodes 123 is referred to as E2. Each dot region in plan view is marked off as the regions E1 and E2.

Reflecting films 111 are provided between the lower substrate 110 and the lower electrode 113. The region of the formation of the reflecting film 111 in the dot region becomes a reflective display region R and the other region except for the reflective display region R becomes a transmissive display region T. This reflecting film 111 is serially provided in the X-direction and at the same time, is plurally arranged in the Y-direction. The lower electrode 113 is formed such that it covers the corresponding reflecting film 111. Also, the Y-direction width of the reflecting film 111 may be arbitrarily set in correspondence to the aperture ratio of the transmissive display region T and the reflective display region R. But if the size of the transmissive display region is set substantially identically to that of the reflective display region, its width is set to half the Y-direction width of the lower electrode 113.

Also, in the present exemplary embodiment, the reflecting film 111 pair with the region E1 positioned therebetween, so that the adjacent dot regions in the X-direction are symmetrically positioned so the transmissive display regions T of the adjacent dot regions are symmetrical to the region E1 or the reflective display regions R of the adjacent dot regions are symmetrical with respect to the region E1. Specifically, if the two dot regions adjacent in the X-direction with respect to the region E1 are assumed to be a group region, the group region between the regions E1 and E2 is plurally arranged to the X-direction and the Y-direction in the lower substrate 110. Each reflecting film 111 is arranged to both ends of each group region in the X-direction. So, the two transmissive display regions T are formed at the center of the group region in the X-direction, or the region E1 is between the two transmissive display regions T at the center position. The two reflective display regions R are formed at both ends of the group region in the X-direction.

Also, color filter layer 121 is formed between the upper substrate 120 and the electrode 123. The color filter layer 121 includes color filters 121R (red), 121G (green) and 121B (blue). These color filters 121R, 121G and 121B are plurally arranged to form a stripe in the X-direction, respectively. The upper electrode 123 mentioned above is formed to cover the corresponding color filter.

Also, a backlight 150 is arranged to the outer surface of the lower substrate 110.

Figure 3:
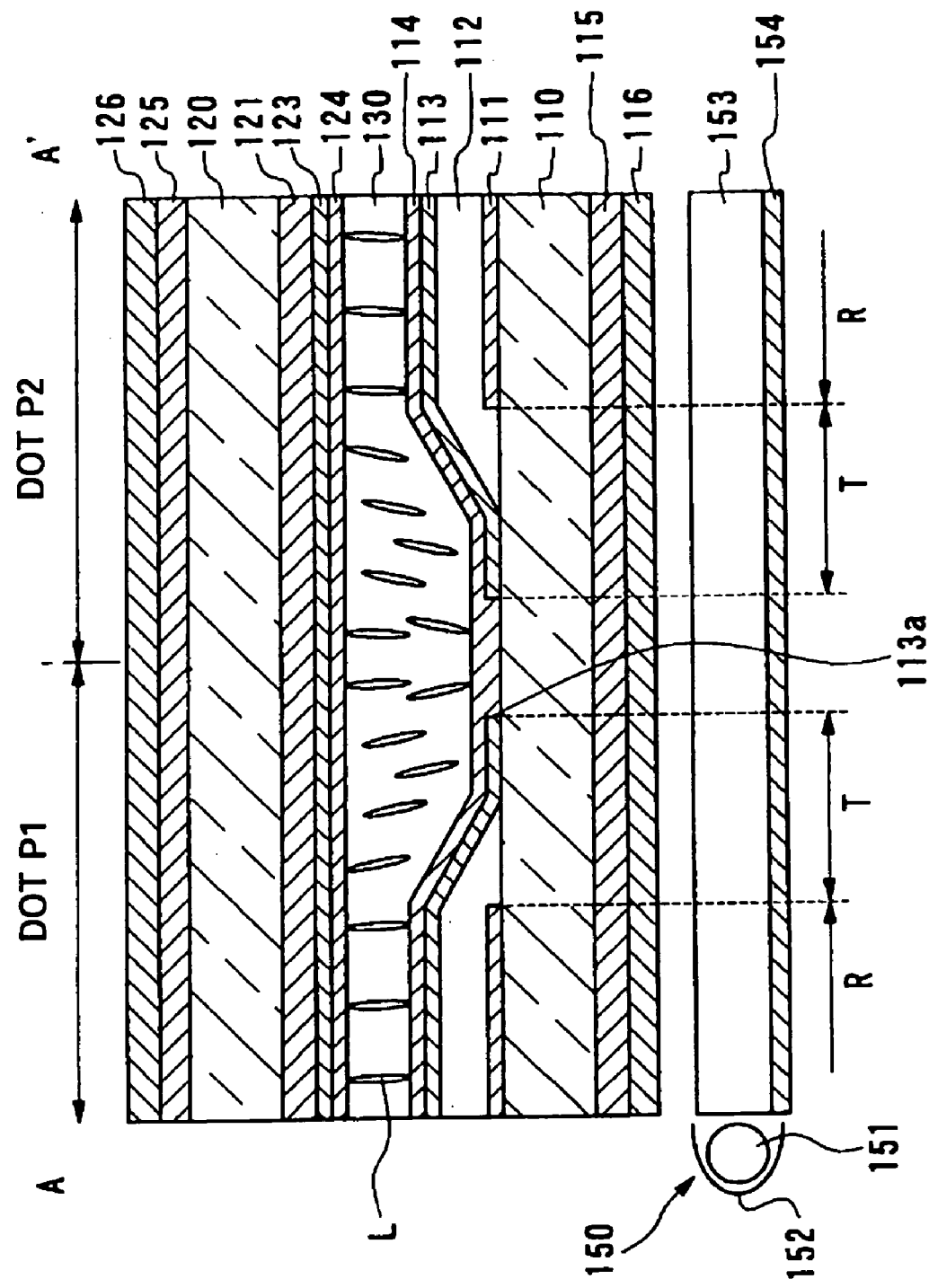
FIG. 3 is a cross-sectional schematic of the primary part of the liquid crystal display according to the first exemplary embodiment of the present invention.

The cross-sectional structure of the liquid crystal display device according to an aspect of the present invention will be explained using FIG. 3. FIG. 3 is a cross-sectional view of the two dot regions along plane A–A' of FIG. 2, showing the cross-sectional structure of the group region mentioned above.

As shown in FIG. 3, a liquid crystal layer 130 is sandwiched between the lower substrate 110 and the oppositely arranged upper substrate 120, where the liquid crystal layer 130 includes liquid crystals with negative dielectric anisotropy whose initial alignment state shows a vertical alignment.

The reflecting film 111, made of metal with a high reflectance such as Aluminum (Al), Silver (Ag), etc., is formed on the lower substrate 110, which is made of a transmittance material such as glass, quartz, plastic, etc. As mentioned above, the formation region of the reflecting film 111 becomes a reflective display region R and the non-formation region of the reflecting film 111 becomes a transmissive display region T.

An insulating film 112 with a thickness that forms a thin liquid crystal layer is positioned corresponding to a reflective display region R on the substrate 110. The insulating film 112 is formed of an organic film, such as acrylic resin, such that its thickness is 2 μm±1 μm, for example. Also the insulating film has an inclined plane 112a near the boundary between the reflective display region R and the transmissive display region T so that the thickness of the film is continuously changed. Because the thickness of the liquid crystal layer 130 is about 2 to 6 μm in a portion where there is no insulating film 112, the thickness of the liquid crystal layer 130 at the reflective display region R is half the thickness of the liquid crystal layer 130 at the transmissive display region T. Specifically, the insulating film 112 is a liquid crystal layer thickness-adjusting layer where the reflective display region R and the transmissive display region T are proportionately adjusted the thickness of a liquid crystal layer 130 by the thickness of the insulating film 112.

In the case of this exemplary embodiment, a flat plane on the upper side of the insulating film 112 is substantially equal in circumference to a reflecting film 111 (a reflective display region), and the inclined plane 112a is included in the transmissive display region T. The liquid crystal layer thickness-adjusting layer is thick around the reflective display region R, but is often thin in the transmissive display region T. Even if the reflecting film 111 is formed under the insulating film 112 (the thickness-adjusting layer of the liquid crystal layer corresponding to the reflective display region) in the present exemplary embodiment, it may be formed on the flat plane of the insulating film 112 or it may be provided between the insulating film 112 and the lower electrode 113 formed of the transparent conductive film. Accordingly, the insulating film 112 over the reflective display region R makes the layer thickness of the liquid crystal layer of the reflective display region R thinner than that of the transmissive display region T. Specifically,. the layer thickness of the liquid crystal layer of the reflective display region R is thicker than that of the transmissive display region T.

The lower electrode 113 and the vertical alignment film 114 are sequentially formed on the surface of the substrate 110 including the surface of the insulating film 112. The lower electrode 113 is made of transparent conductive film, such as Indium Tin Oxide (ITO).

A color filter layer 121 is provided on the inside surface of the upper substrate 120, which is made of a transmittance material such as glass, quartz, plastic. In the color filter layer 121, the color filters 121R of red, 121G of green, and 121B of blue are arranged on the adjacent dot regions so that the three adjacent dot regions form a single pixel. Also, in order to compensate for the different chroma of display colors using the reflective versus transmissive display, additional color filters with different color purity may be provided in the reflective display region R and the transmissive display region T. The upper electrode 123 and the vertical alignment film 124 are sequentially formed on the color filter layer 121 and the upper electrode 123 is made of transparent conductive film, such as ITO.

Also, on the outside surface of the lower substrate 110 and on the outside surface of the upper substrate 120, retardation plates (a method to create circular polarizing incident light) 115 and 125, and polarization plates 116 and 126, are provided on each of the substrates, respectively. The retardation plates 115 and 125 have a phase difference of about ¼ of a wavelength with respect to that of the visible light. The circular polarized light is incident to the liquid crystal layer 130 from both the substrate 110 and the substrate 120, using the combination of the retardation plates 115 and 125 and the polarization plates 116 and 126. Also, the backlight 150 with light source 151, refector 152, waveguide plate 153 and reflective plate 154, etc. is provided on the outside of the liquid crystal cell facing the outside surface of the substrate 110.

Figure 4A:
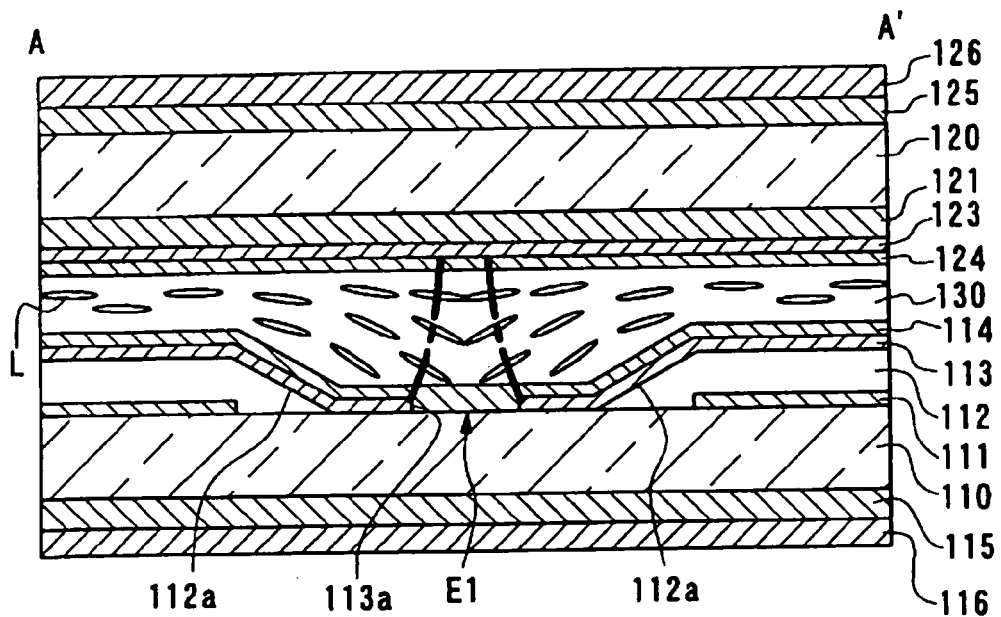
FIGS. 4a and 4b are cross-sectional schematics for explaining the operation of the liquid crystal display device according to the first exemplary embodiment of the present invention.
Figure 4B:
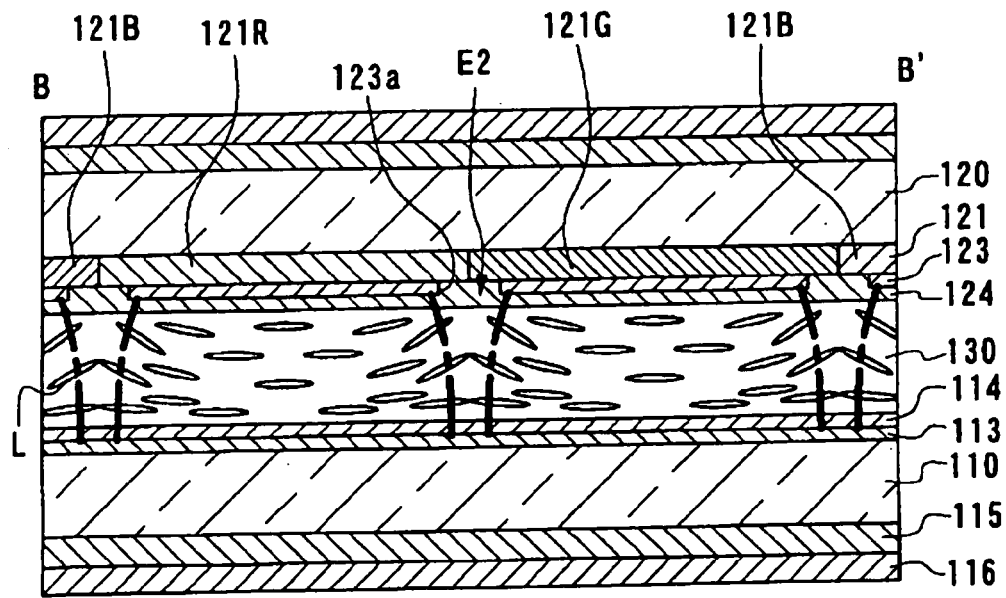

The operation of the liquid crystal display device according to an aspect of the present invention will be explained below referring to FIGS. 4 and 5. FIGS. 4a and 4b are views showing the liquid crystal alignment states along planes A–A' and B–B' of FIG. 2 in each state when a voltage is applied. Also, in FIG. 4, a transverse electric field generated in the edges 113a and 123a of the electrodes 113 and 123 is illustrated by single dotted line.

When a voltage is applied between the electrodes 113 and 123 in the configuration mentioned above, as shown in FIG. 4a, liquid crystal molecules L positioned in the vicinity of the region E1 are aligned obliquely toward the electrode center (the dot center) from the edge 113a by the transverse electric field generated at the edge 113a of the lower electrode 113. The surrounding liquid crystal molecules L are also aligned obliquely toward the dot center following the motion of the alignment above. Similarly, as shown in FIG. 4b, liquid crystal molecules L positioned in the vicinity of the region E2 are aligned obliquely toward the electrode center (the dot center) from the edge 123a by the transverse electric field generated at the edge 123a of the upper electrode 123. The surrounding liquid crystal molecules L also are aligned obliquely toward the dot center following the motion of the alignment above.

Figure 5:
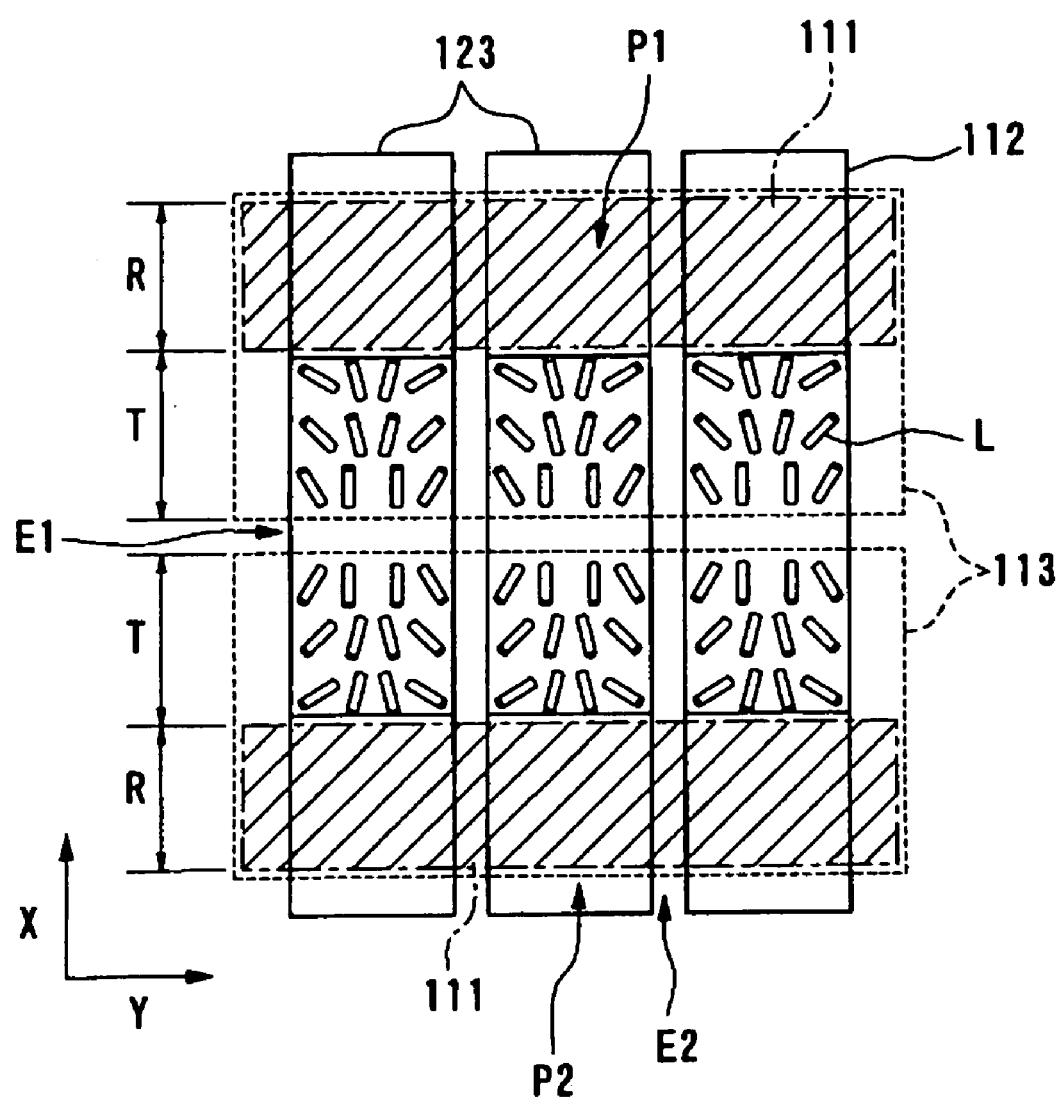
FIG. 5 is a schematic showing the alignment state of the liquid crystal of the liquid crystal display device according to the first exemplary embodiment of the present invention.

Therefore, as shown in FIG. 5, for example, in region E1, which is between the dot regions P1 and P2, which are adjacent in the X-direction, the liquid crystal molecules L positioned at each of the transmissive display regions T are aligned obliquely to each other in the reverse directions. Similarly, in the reflective display region R, the liquid crystal molecules L positioned at each of the reflective display regions R of the dot regions P1 and P2 are aligned obliquely in the reverse direction.

All of the transmissive display region T and the reflective display regions R within a single group region are in an aligned and divided state, the group region including the dot regions P1 and P2. Similarly, all of the transmissive display regions T and the reflective display regions R within a group region are in an aligned and divided state, the group region including the two dot regions adjacent in the Y-direction and the region E2 therebetween.

As the present exemplary embodiment has been explained above, when the region between the dots in which electrodes are not formed is considered to be the related art electrode slit, the alignment of the liquid crystal is controlled by actively using the transverse electric field generated at the dot edge with applied voltage. Therefore, comparing to the related art with an additionally provided electrode slit, etc., the aperture ratio of the present exemplary embodiment is high and is capable of displaying high brightness and high contrast. Particularly, in an aspect of the present invention, since the transmissive display regions T or the reflective display regions R of the adjacent dots are symmetrically positioned to the region E1 or E2, which is between the dots, when a voltage is applied, the liquid crystal molecules L in the regions T and R can be inclined in the reverse directions. Thereby, the liquid crystal layer 130 between the region E1 or E2 is in an aligned and divided state through the two dot regions, thereby realizing display with wide viewing angle. Since the substantially identical displays are performed on the two adjacent dot regions, they can be presumably treated as a dot. But in the present exemplary embodiment, since the liquid crystal within the one dot region set presumably can be aligned and divided in two directions, the viewing angle can be enhanced.

Also, in the first exemplary embodiment of the present invention, since the thicknesses of the liquid crystal layers of the reflective display region R and the transmissive display region T are implemented differently from each other by the thickness-adjusting layer 112 of a liquid crystal layer, the retardations caused by the reflective display region R and the transmissive display region T can approach closely or can be substantially equal to each other, thereby enhancing contrast. In particular, in the exemplary embodiment of the present invention, since an inclined plane 112a is provided on the a liquid crystal layer thickness-adjusting layer 112, a pre-tilt corresponding to this angle can be given with respect to the liquid crystal molecules in the vicinity of the inclined plane. Therefore, as the tilt of the surrounding liquid crystal is defined according to the tilt of the liquid crystal in the vicinity of the inclined plane, the alignment disclination generated disorderly can be reduced or prevented and a clear display with less rough deposits can be realized.

Modification

The liquid crystal display device as a modification according to the first exemplary embodiment of the present invention will be explained below with reference to FIGS. 6a, 6b, 7a and 7b. FIGS. 6a, 6b, 7a and 7b are plan views showing the alignment states of the liquid crystals of liquid crystal display device according to the first, second and third modifications of the first exemplary embodiment of the present invention corresponding to FIG. 5. These modifications are seen as the arrangements of the reflecting film and the liquid crystal layer thickness-adjusting layer are modified in the first exemplary embodiment of the present invention. Also, the same elements in the present modification and the first exemplary embodiment are indicated by the same reference numerals.

First, the first modification will be explained below referring to FIG. 6.

Figure 6A:
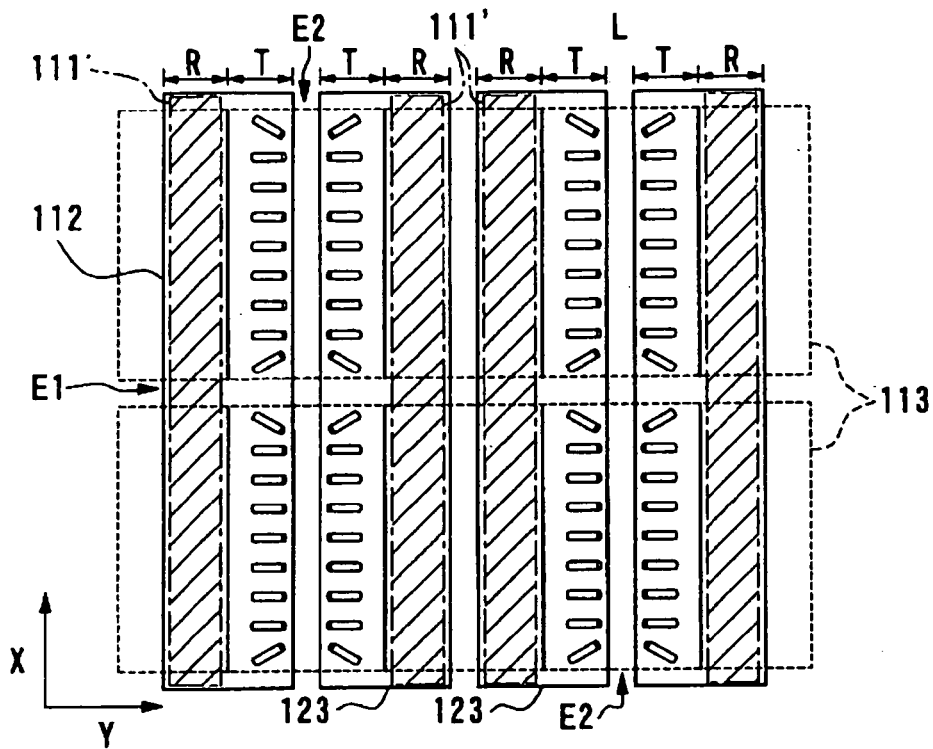
FIGS. 6a and 6b are schematics showing the alignment state of the liquid crystal of a modification of the first exemplary embodiment of the present invention.

As shown in FIG. 6a, the reflecting film 111' is serially provided in the X-direction and at the same time, is plurally arranged in the Y-direction. The Y-direction width of the reflecting film 111' may be arbitrarily set to correspond to the aperture ratio of the transmissive display region T and the reflective display region R. For example, it is set to half the Y-direction width of the upper electrode 123.

Also, in the present modification, the reflecting film 111' forms a pair with the region E2 positioned therebetween, so that the adjacent dot regions in the Y-direction are symmetrically positioned when the transmissive display regions T of the adjacent dot regions are symmetrical with respect to the region E2 or the reflective display regions R of the adjacent dot regions are symmetrical with respect to the region E2. Specifically, if the two dot regions adjacent in the Y-direction with respect to the region E2 are assumed to be a group region, the group regions between the regions E1 and E2 are plurally arranged in the X-direction and Y-direction positioning in the lower substrate 110. Each reflecting film 111' is arranged in the Y-direction to both ends of each group region. Thereby, the two transmissive display regions T are created at the center of the group region in the Y-direction, or the region E2 is between the two transmissive display regions T at the center position. The two reflective display regions R are created in the Y-direction at both ends of the group region.

The liquid crystal layer thickness-adjusting layer 112' is provided protruding into the liquid crystal layer 130 in a position that corresponds to the reflective display region R in the substrate 110, so that the thickness of the liquid crystal layer of the reflective display region R is half that of the transmissive display region T.

The others are the same as the first exemplary embodiment.

Accordingly, in the modification of the first exemplary embodiment of the present invention, a display with high brightness, high contrast and wide viewing angle can be made without creating an additional electrode slit or a protrusion. Also, since the transmissive display region T and the reflective display region R are arranged along the edges of the long edges of the dot regions shaped as a substantial rectangle, the present modification can effectively reduce or prevent disclination from occurring, compared to the first exemplary embodiment arranging the regions T and R along the short edges of the dot regions.

Specifically, when the alignment of the liquid crystal is controlled using the transverse electric field generated around the dot periphery, the alignment confining force can be increased as the proportion of liquid crystal molecules facing the edges of the dot regions is increased. In particular, in the present modification, since the proportion of the liquid crystal molecules facing the long edge is increased and the proportion of the liquid crystal molecules facing the short edge is decreased, compared to the first exemplary embodiment, the effect of the transverse electric field of the short edge can be decreased to the maximum and the alignment confining direction operating the liquid crystal molecules L can be limited essentially to one direction (the alignment confining direction by the transverse electric field of the long edge). If the alignment confining directions are in two directions, the disclination occurs at the boundary. But since the present modification generates hardly the disclination, it can provide a relatively clear display with less rough deposits.

Figure 6B:
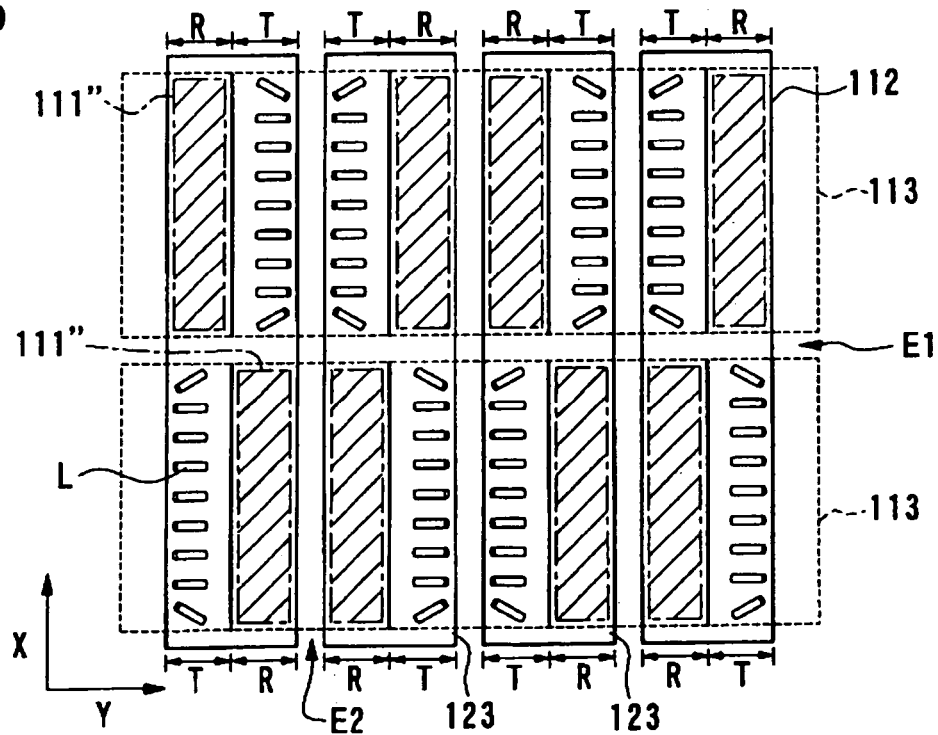

Regarding the plurality of dot regions aligned in the X-direction in the configuration mentioned above, the relationship of all positions is the same between the transmissive display region T and the reflective display region R. But, as shown in FIG. 6b, this relationship of positions may be reversed in the adjacent dot regions in the X-direction. Specifically, as shown in FIG. 6b, in the dot regions adjacent in the X-direction in which the region E1 is therebetween, the reflecting film 111'' may be alternately arranged at the left and right in the adjacent direction (X-direction). In this case, the thickness-adjusting layer 112'' of liquid crystal layer formed on the reflective display region R is also alternately arranged at the left and right sides regarding the dot regions adjacent in the X-direction. All these configurations obtain the same effect.

Referring to FIG. 7, the second modification will be explained below.

In the present modification, the reflecting film 111''' is serially provided at the center of the lower electrode 113 in the Y-direction and at the same time, plurally arranged in the X-direction. The X-direction width of the reflecting film 111''' may be set to half the X-direction width of the lower electrode 113, for example. Thereby, two transmissive display regions T are formed at both sides of the lower electrode 113 in the X-direction in one dot region and one reflective display region R is formed at the center of the lower electrode 113 in the X-direction.

The liquid crystal layer thickness-adjusting layer 112' is provided protruding into the liquid crystal layer 130 in a position corresponding to the reflective display region R in the substrate 110 so that the thickness of the liquid crystal layer of the reflective display region R is half that of the transmissive display region T.

The others are the same as the first exemplary embodiment.

Accordingly, in the present modification like the first exemplary embodiment, a display with high brightness, high contrast and wide viewing angle can be created without forming an additional electrode slit or a protrusion. In the present modification, since the liquid crystal molecules L of the transmissive display regions T provided at two positions are inclined toward the center of the dot by the transverse electric field generated in each edge of the lower electrode 113, the liquid crystals of each transmissive display region T are aligned obliquely to each other in the reverse directions. Therefore, the liquid crystal within the transmissive display region T can be aligned and divided within one dot region, thereby creating a display with wider viewing angle.

Figure 7A:
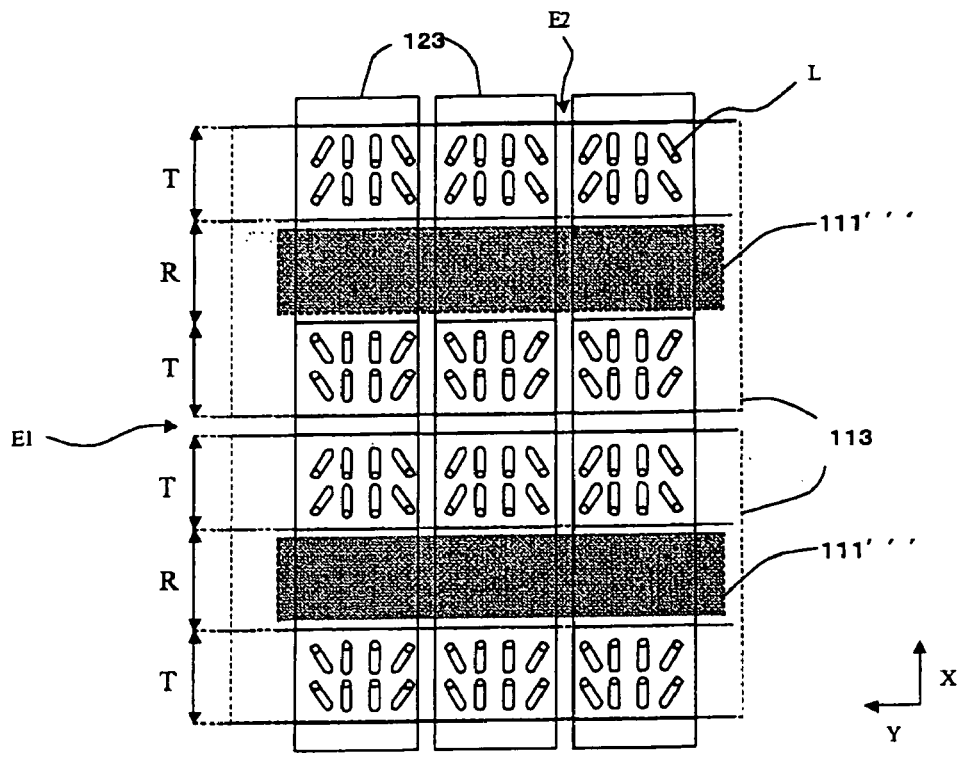
FIGS. 7a and 7b are schematics showing the alignment state of the liquid crystal of a modification of the first exemplary embodiment of the present invention.
Figure 7B:
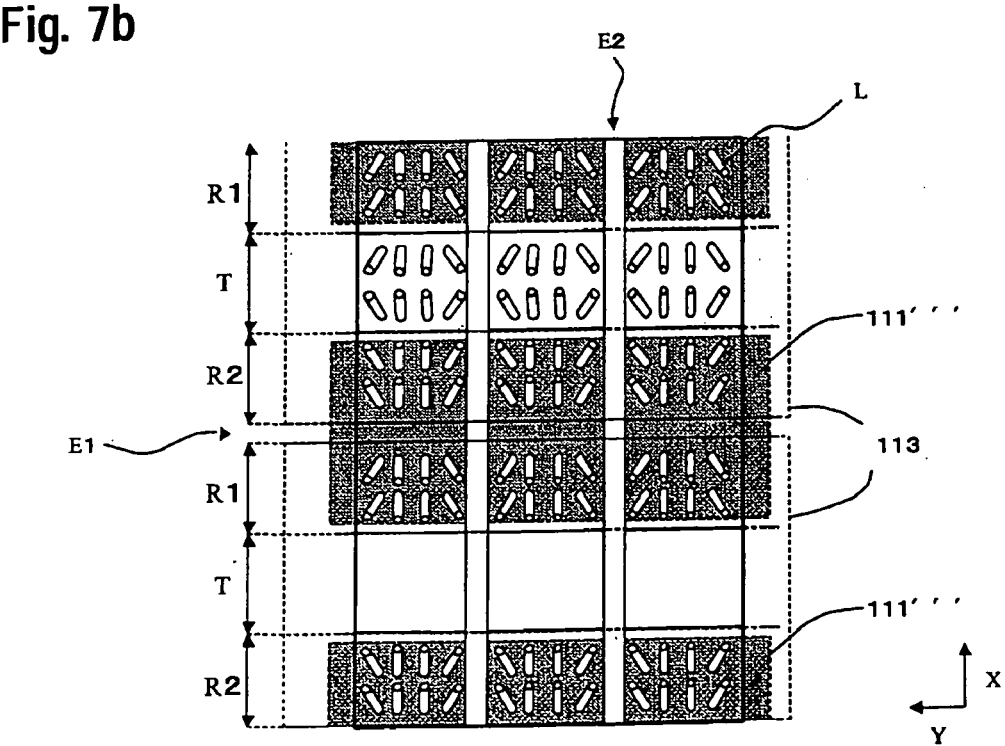

Referring to FIG. 7b, the third modification will be explained below.

In the present modification, the reflecting film 111''' is serially provided at the upper and lower edges of the lower electrode 113 in the Y-direction and at the same time, plurally arranged and formed in the X-direction. The X-direction width of the reflecting film 111''' may be set to half the X-direction width of the lower electrode 113, for example. Thereby, two reflective display regions R1 and R2 are formed at both sides of the lower electrode 113 in the X-direction in a dot region and one transmissive display region T is formed at the center of the lower electrode 113 in the X-direction therein.

The liquid crystal layer thickness-adjusting layer 112' is provided protruding into the side of the liquid crystal layer 130 in a position corresponding to the reflective display regions R1 and R2 in the substrate 110, so that the thickness of the liquid crystal layer of the reflective display regions R1 and R2 is half that of the transmissive display region T.

The others are the same as the first exemplary embodiment.

Accordingly, in the present modification like the first exemplary embodiment, a display with high brightness, high contrast and wide viewing angle can be created without forming an additional electrode slit or a protrusion. In the present modification, since the liquid crystal molecules L of the reflective display regions R provided at two positions are inclined toward the center of the dot by the transverse electric field generated in each edge of the lower electrode 113, the liquid crystals of each reflective display region R are obliquely aligned in the reverse directions. Also, the alignment of the liquid crystal molecules of the transmissive display region T is defined by the reflective display regions R1 and R2 arranged in the upper and lower sides. Therefore, the liquid crystal within the transmissive display region T and the reflective display regions R1 and R2 can be aligned and divided within a dot region, thereby creating a display with wide viewing angle.

Second Exemplary Embodiment

Figure 8:
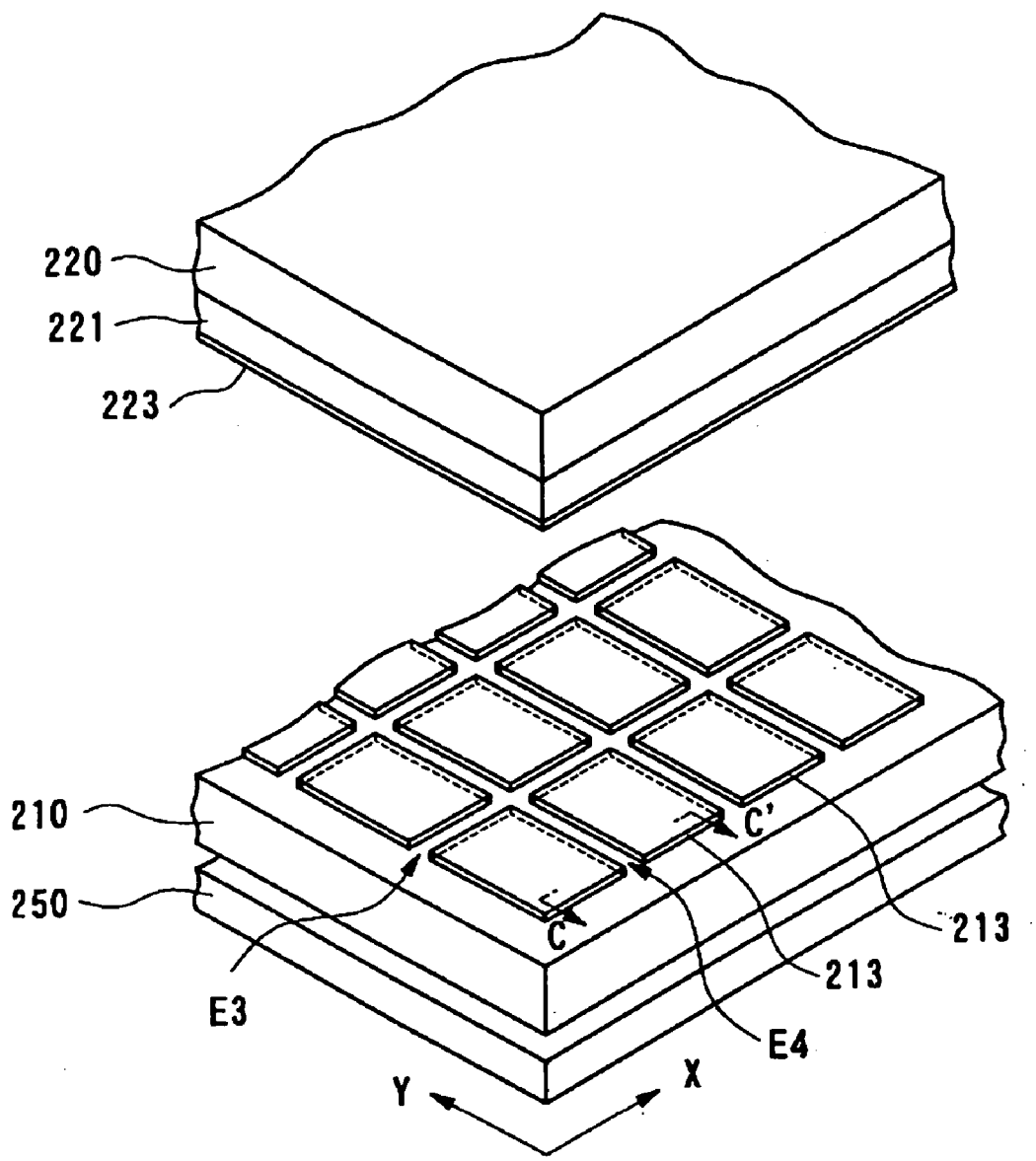
FIG. 8 is a schematic of a liquid crystal display device according to the second embodiment of the present invention.
Figure 9:
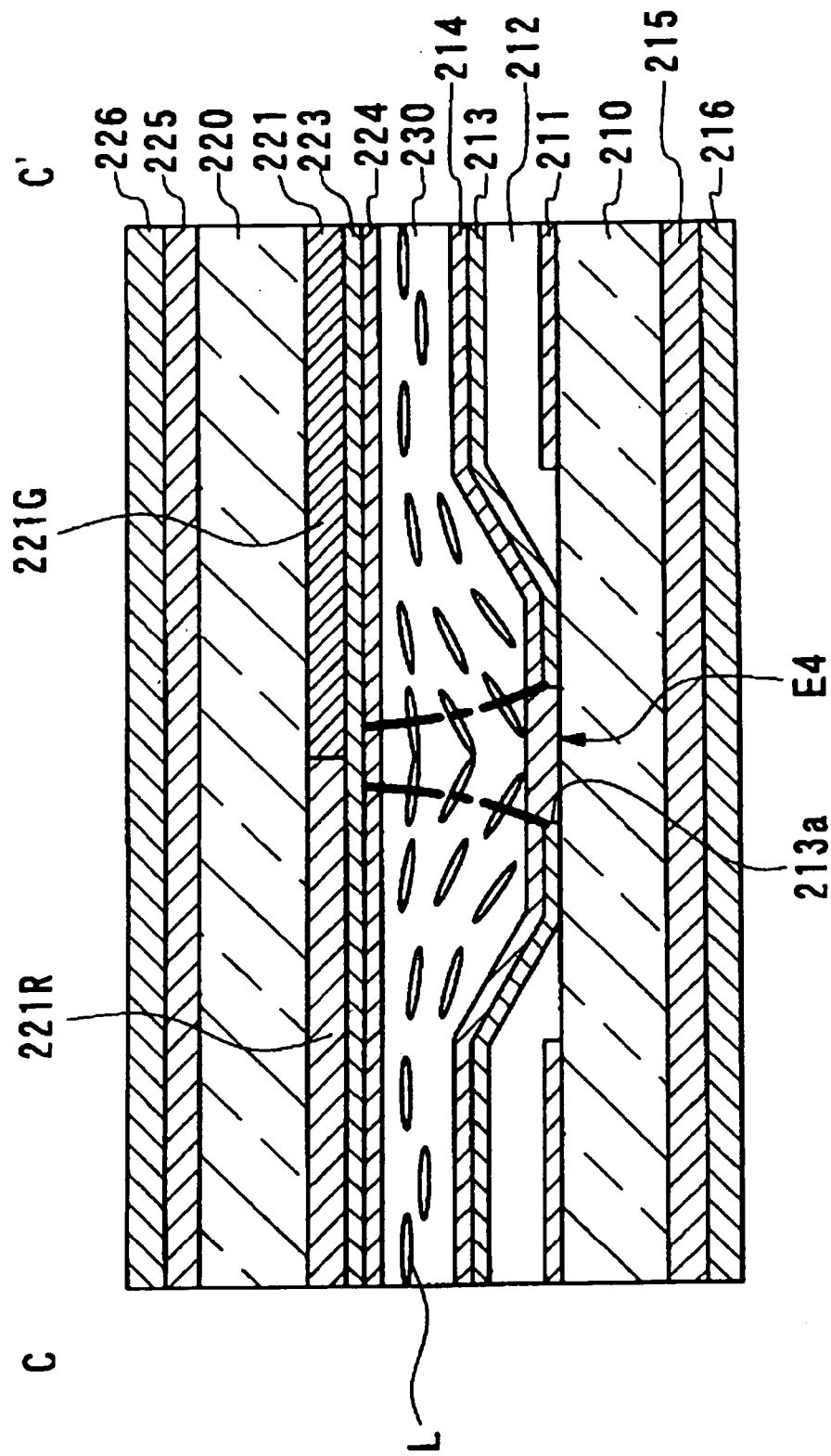
FIG. 9 is a cross-sectional schematic of a primary part of the liquid crystal display according to the second exemplary embodiment of the present invention.
Figure 10:
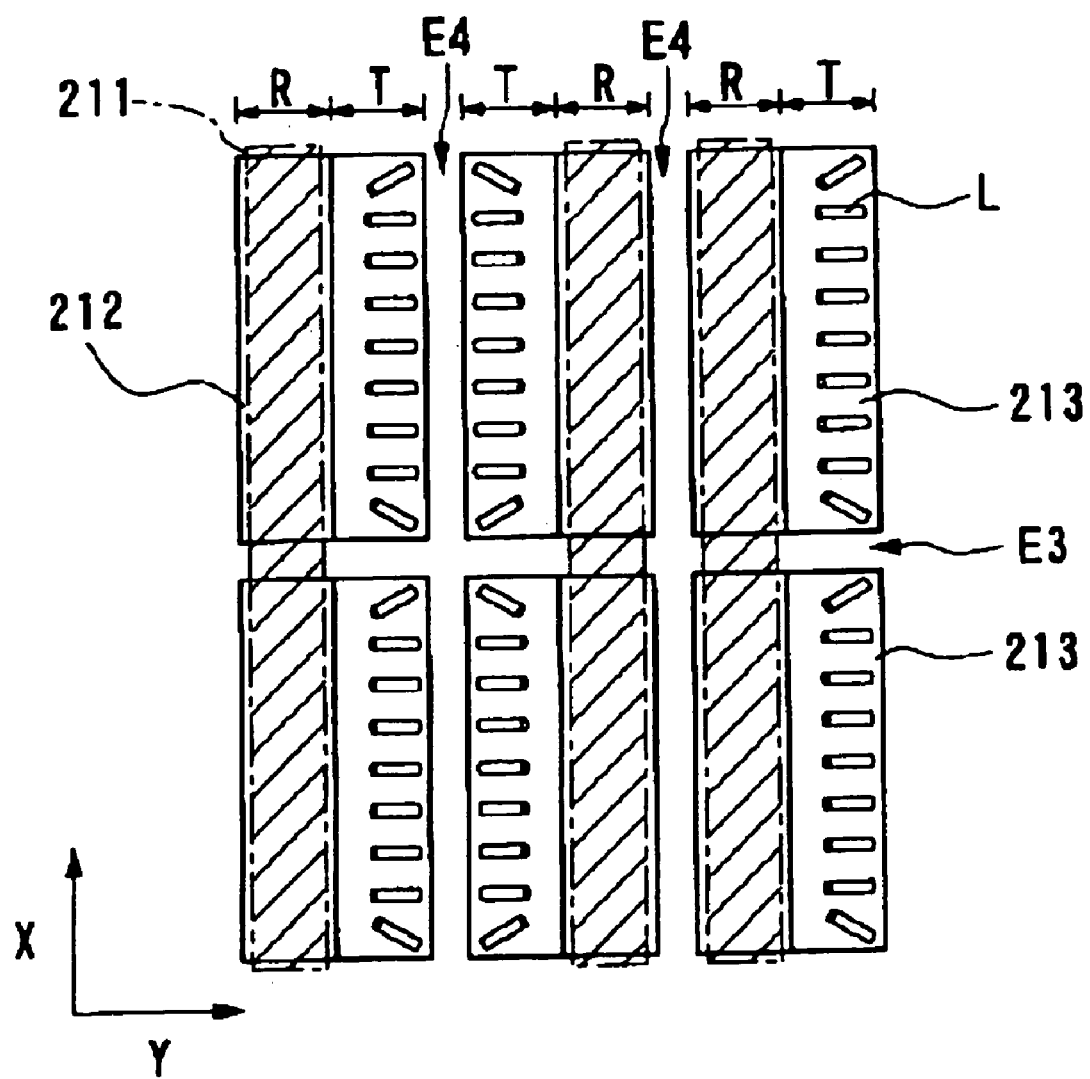
FIG. 10 is a schematic showing the alignment state of the liquid crystal of the liquid crystal display device according to the second exemplary embodiment of the present invention.

Referring to FIGS. 8 to 10, the liquid crystal display device according to the second exemplary embodiment of the present invention will be explained below. FIG. 8 is a schematic of the liquid crystal display device according to the second embodiment of the present invention, FIG. 9 is a cross-sectional schematic of a primary part thereof, and FIG. 10 is a schematic showing the alignment state of the liquid crystal molecules.

First, the configuration of the liquid crystal display device according to second exemplary embodiment of the present invention will be explained below, referring to FIG. 8.

The second exemplary embodiment of the present invention is a matrix type liquid crystal display device. Substantially rectangular pixel electrodes 213 are formed on the lower substrate 210 of a TFT array substrate and the common electrodes 223 are formed on the upper substrate 220 opposite to the lower substrate 210. The pixel electrode 213 is plurally arranged in the lower substrate 210 as a matrix. The forming region of each pixel electrode 213 includes each dot region. The dot regions are arranged in a matrix to from an image display region. Also, as shown in FIG. 8, there is a region where pixel electrodes 213 are not formed, which is called an inter-pixel region. Specifically, of the regions, the inter-pixel region serially provided in the X-direction (or the short edge direction of the pixel electrode 213) is illustrated by symbol, E3. The inter-pixel region serially provided in the Y-direction (or the long edge direction of the pixel electrode 213) is illustrated by symbol, E4.

Reflecting films 211 are provided between the lower substrate 210 and the pixel electrode 213. The formation region of the reflecting film 211 in a dot region becomes a reflective display region R. The other region, except for the reflecting film 211, becomes a transmissive display region T (refer to FIG. 10). This reflecting film 211 is serially provided in the X-direction and at the same time, is plurally formed in the Y-direction. The pixel electrode 213 is formed so that it covers the corresponding reflecting film 211. Also, the Y-direction width of the reflecting film 211 may be arbitrarily set to correspond to the aperture ratio of the transmissive display region T and the reflective display region R. But if the size of the transmissive display region T is set to that of the reflective display region R, its width is set to about half the length of short edge of the pixel electrode 213.

Also, in the present exemplary embodiment, the reflecting film 211 pair with the region E4 positioned therebetween, so that the adjacent dot regions are symmetrically positioned when the transmissive display regions T of the adjacent dot regions are symmetrical with respect to the region E4 or the reflective display regions R of the adjacent dot regions are symmetrical with respect to the region E4. Specifically, if the two dot regions adjacent in the Y-direction with respect to a region E4 are assumed to be a group region, the group region between the regions E3 and E4 is plurally arranged in the X-direction and the Y-direction positioning in the lower substrate 210. Each reflecting film 211 is arranged to both ends of each group region in the Y-direction. Thereby, the two transmissive display regions T are formed at the center of the group region in the Y-direction, or the region E4 is between the two transmissive display regions T at the center position. The two reflective display regions R are formed at both ends of the group region in the Y-direction.

Also, color filter layer 221 is formed between the upper substrate 220 and the electrode 223. The color filter layer 221 includes color filters of red, green and blue (in FIG. 9, the red and the green color filters are indicated by symbols 221R and 221G, respectively). These color filters are plurally arranged and formed at a position corresponding to the forming position of the pixel electrode 213. The common electrode 223 mentioned above is formed to cover the color filter layer 221.

Also, a backlight 250 is arranged on the outside of the lower substrate 210.

The cross-sectional structure of the liquid crystal display device according to the present invention will be explained below referring to FIG. 9. FIG. 9 is a cross-sectional view of the two dot regions along plane C–C' of FIG. 8, showing the cross-sectional structure of the group region mentioned above.

As shown in FIG. 9, a liquid crystal layer 230 is sandwiched between the lower substrate 210 and the opposite upper substrate 220, the liquid crystal layer 230 including liquid crystals with negative dielectric anisotropy whose initial alignment state is vertical.

The reflecting film 211, made of metal with a high reflectance such as Al, Ag, etc., is formed on the lower substrate 210, which is made of transmitting material such as glass, quartz, plastic, etc. As mentioned above, the formation region of the reflecting film 211 becomes a reflective display region R and the non-formation region of the reflecting film 111 becomes a transmissive display region T.

An insulating film (a liquid crystal layer thickness-adjusting layer) 212 made of organic film, such as acrylic resin at a position corresponding to the reflective display region R, is formed on the substrate 210, so that the thickness of the liquid crystal layer 230 in the reflective display region R is about half the thickness of the liquid crystal layer 230 in the transmissive display region T. The insulating film 212 has an inclined plane 212a so that its thickness can be continuously changed near the boundary of the reflective display region R and the transmissive display region T. The upper edge of the flat surface of the insulating film 212 is substantially identical to that of the reflecting film 211 (reflective display region R), and the inclined plane 212a is included in the transmissive display region T.

The pixel electrode 213 and the vertical alignment film 214 are sequentially formed on the surface of the substrate 210 including the surface of the insulating film 212 and the pixel electrode 213 is formed of a transparent conductive film, such as ITO.

A color filter layer 221 is provided on the inside surface of the upper substrate 220 made of a transmitting material, such as glass, quartz, and plastic. In this color filter layer 221, the color filters of red (R), green (G), and blue (B) are arranged among the adjacent dot regions such that the three adjacent dot regions form a single pixel. Also, in order to compensate for the chroma differences of the reflective and the transmissive display, additional color filters of different color purity may be provided in the reflective display region R and the transmissive display region T. The common electrode 223 and the vertical alignment film 224 are sequentially formed on the color filter layer 221 and the common electrode 223 is formed of a transparent conductive film such as ITO.

Also, in the present exemplary embodiment, the lower substrate 210 is a TFT array substrate. But the TFT as a switching element or the various wires are omitted in FIG. 9.

Also, on the outside surface of the lower substrate 210 and on the outside surface of the upper substrate 220, retardation plates (a method to create circular polarizing incident light) 215 and 225, polarization plates 216 and 226 are provided on each of the substrates, respectively. The retardation plates 215 and 225 have a phase difference of about ¼ of a wavelength with respect to that of the visible light. The circular polarized light is incident to the liquid crystal layer 230 from both sides of the substrate 210 and the substrate 220 using the combination of the retardation plates 215 and 225 and the polarization plates 216 and 226.

When a voltage is applied between electrodes 213 and 223 in the configuration mentioned above, as shown in FIG. 9, the liquid crystal molecules L positioned near the region E4 are aligned obliquely toward the electrode center (the dot center) from the edge 213a by the operation of the transverse electric field (which is indicated by single dotted line, in FIG. 9) generated at the edge 213a of the pixel electrode 213. And the surrounding liquid crystal molecules L following the motion above are aligned obliquely toward the dot center. The same situation occurs near the region E3.

Specifically, all of the transmissive display region T and the reflective display region R within a group region are in an aligned and divided state, the group region including the two dot regions adjacent in the Y-direction and the region E4 is therebetween. Similarly, all of the transmissive display region T and the reflective display region R within a group region are in an aligned and divided state, the group region including the two dot regions adjacent in the X-direction and the region E3 is therebetween.

In this way, in the present exemplary embodiment, the liquid crystal layer 230 is aligned and divided through the two dot regions using the transverse electric field of the edge 213a of the pixel electrode 213, wherein the region E3 or E4 is therebetween. Therefore, a display with high brightness, high contrast and wide viewing angle can be created without forming an additional electrode slit or a protrusion. Also, in the present exemplary embodiment, since the transmissive display region T and the reflective display region R are arranged along the edge of the long side of the substantially rectangular dot region, the effect of the transverse electric field generated at the edge of the short side of the pixel electrode 213 becomes sufficiently smaller compared to that of the long side thereof, and the parasitic alignment force operating on the liquid crystal molecules L within each of the display regions T and R goes in substantially one direction (specifically, the alignment direction caused by the transverse electric field of the long edge). Therefore, the disclination caused as the two alignment confining forces interfere is reduced or prevented, thereby obtaining a clear display showing relatively less rough deposits.

Modification

With reference to FIGS. 11 to 18, the liquid crystal display device as a modification according to the second exemplary embodiment of the present invention will be explained below. Also, the same elements in the present modification and the second exemplary embodiment are indicated by the same reference numerals and are not explained further.

Figure 11:
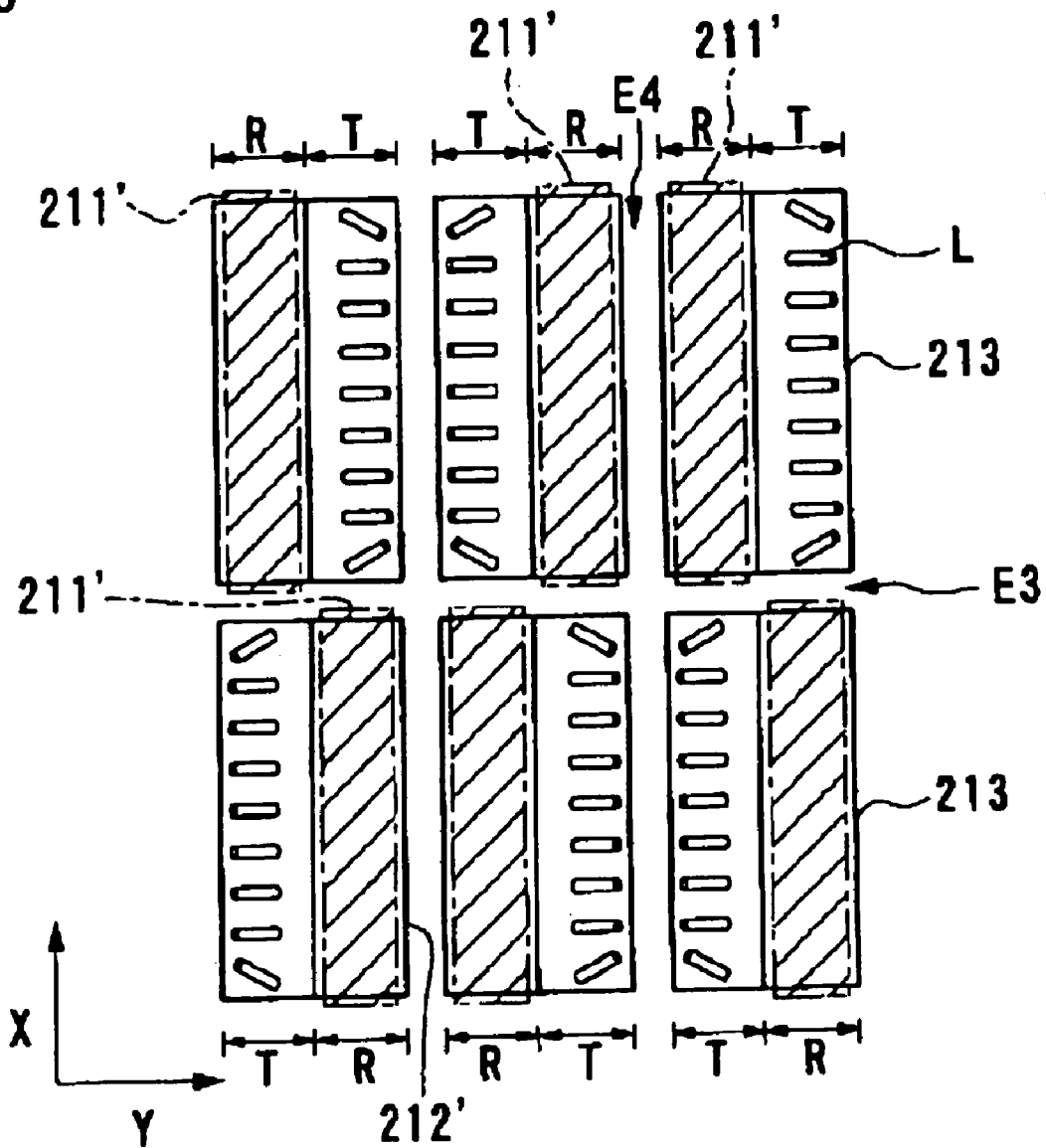
FIG. 11 is a schematic showing the alignment state of the liquid crystal of a modification of the second exemplary embodiment of the present invention.

First, a first modification according to the second exemplary embodiment will be explained below referring to FIG. 11. FIG. 11 is a schematic showing the alignment state of the liquid crystal of a modification of the second exemplary embodiment of the present invention, which corresponds to FIG. 10.

The present modification is implemented as the arranging relationship between the transmissive display region T and the reflective display region R within a dot region in the second exemplary embodiment is modified. Specifically, the configuration of the second exemplary embodiment shows that, in a plurality of dot regions aligning in the X-direction, the positioning relationship between the transmissive display region T and the reflective display region R is the same. But the present modification shows that the positioning relationship is reversed between the dot regions adjacent in the X-direction. Specifically, the present modification shows that, the reflecting film 211' is alternately arranged at left and right with respect to the adjacent dot regions where the region E3 is therebetween, and fitting with this situation, the liquid crystal layer thickness-adjusting layer 212' is also alternately arranged at left and right regarding the adjacent dot region, wherein the region E3 is therebetween.

The others are the same as that of the second exemplary embodiment.

Even if the modification is configured as mentioned above, it can obtain the same effect as the second exemplary embodiment.

Figure 12A:
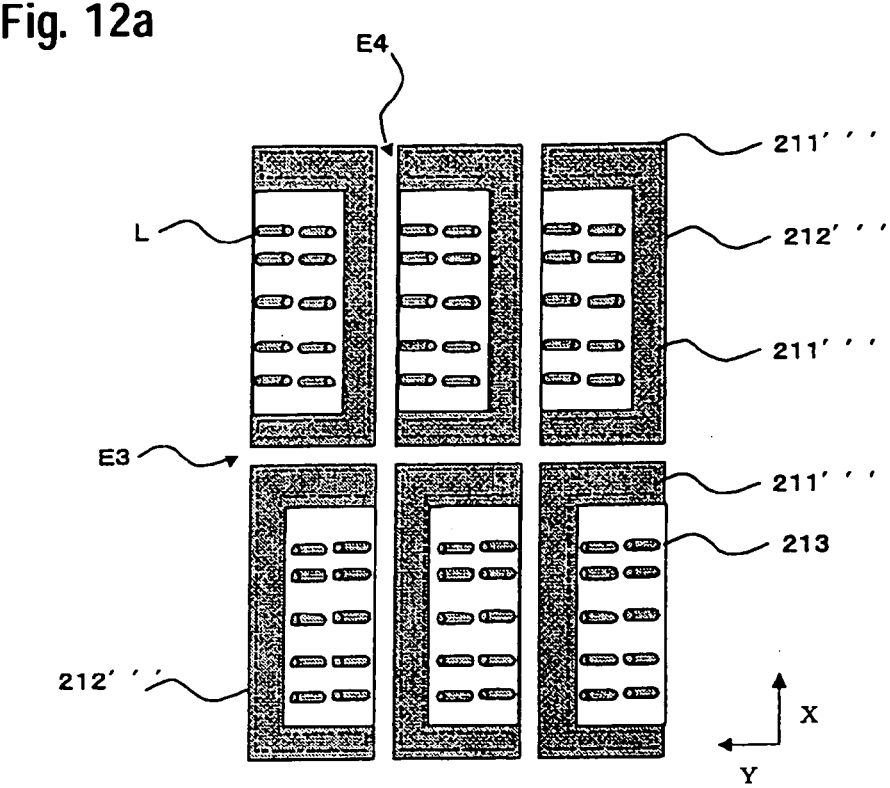
FIGS. 12a and 12b are schematics showing the alignment state of the liquid crystal of a modification of the second exemplary embodiment of the present invention;.

The second modification of the second exemplary embodiment will be explained below referring to FIG. 12*a*. FIG. 12*a* is a plan view showing the alignment state of the liquid crystal of a modification of the second exemplary embodiment of the present invention, which corresponds to FIG. 10.

The present modification shows that, within a dot region, the reflective display region R is provided along the three edges of the substantially rectangular dot region to form a U-shape in plan view, and the transmissive display region T is arranged along the other one edge thereof. Specifically, the present modification shows that the transmissive display region T has a single place facing the region E4, and, in order to surround this, the reflecting film 211" is provided at the position facing the three other edges thereof to form a U-shape in plan view. Also a liquid crystal layer thickness-adjusting layer 212" is formed thereon.

Also, the present modification shows that the arranging relationship between the transmissive display region T and the reflective display region R is inversed between the dot regions adjacent in the Y-direction, so that the alignment division of the liquid crystal is implemented within the two dot regions (specifically, within the single group region formed of these dot regions) adjacent in the X-direction, wherein the region E3 is therebetween. Specifically, the transmissive display regions T or the reflective display regions R of the two dot regions adjacent in the X-direction, where the region E3 is therebetween, are provided at positions facing each other, the positions being to the left and right sides of the direction (X-direction) in which these dot regions are adjacent to each other.

The others are the same as the second exemplary embodiment.

This configuration shows that the tilt direction of liquid crystal in the transmissive display region T provided at the edge positioned at the left with respect to the adjacent direction (the X-direction, in which one side of the dot region is adjacent) is reversed to that in the transmissive display region T provided at the edge positioned at the right with respect to the adjacent direction which is the other side of the dot region. Therefore, the alignment division between these transmissive display regions T produces a display with wide viewing angle.

Also, the present modification shows that, since the liquid crystal molecules L of the transmissive display region T face an edge of the dot region, especially only the edge of the long side, there is hardly the alignment disclination when comparing the case where the liquid crystal molecules face both edges of the long side and the short side which have the alignment confining direction different from each other.

Also, FIG. 12*a* shows that, the arranging relationship between the transmissive display region T and the reflective display region R is the same between the dot regions adjacent in the Y-direction. But this relationship may be inversed between the dot regions adjacent in the Y-direction. Thereby, the alignment division of the liquid crystal can be implemented within the two dot regions (within a single group region formed of these dot regions) adjacent to the Y-direction, where the region E4 is therebetween.

The third modification of the second exemplary embodiment will be explained below referring to FIG. 12(*b*). FIG. 12(*b*) is a plan view showing the alignment state of the liquid crystal of a modification of the second exemplary embodiment of the present invention, which corresponds to FIG. 10.

The present modification shows that, within a dot region, the transmissive display region T is provided along the three edges of the substantially rectangular dot region to form a U-shape in plan view, and the reflective display region R is arranged along the other edge thereof. Specifically, the present modification shows that, a single place forming the reflective display region R is arranged at a position facing the region E4, and then the reflecting film 211''' is formed in the reflective region R. Also, a liquid crystal layer thickness-adjusting layer 212''' is formed thereon. Also, the transmissive region T is provided at a position facing the three other edges to form a U-shape in plan view, so that it surrounds the reflective region R.

Also, the present modification shows that, the arranging relationship between the transmissive display region T and the reflective display region R is inversed between the dot regions adjacent in the Y-direction, so that the alignment division of the liquid crystal is implemented within the two dot regions (specifically, within a single group region formed of these dot regions) adjacent in the X-direction, the region E3 being therebetween. Specifically, the transmissive display regions T or the reflective display regions R of the two dot regions adjacent in the X-direction, wherein the region E3 is therebetween, are provided at positions facing each other, where the positions are to the left and right sides of the direction (X-direction) adjacent to these dot regions.

The others are the same as the second exemplary embodiment.

This configuration shows that, the tilt direction of liquid crystal in the reflective display region R provided at the edge positioned at the left side with respect to the adjacent direction (the X-direction, in which one side of the dot region is adjacent) is the reverse of that in the reflective display region R provided at the edge positioned at the right side with respect to the adjacent direction, which is the other side of the dot region. Also, in the transmissive region adjacent to these reflective regions, a dot is tilted in about three different directions by the effect of the liquid crystal molecules of the reflective region tilt and the regions E3 and E4. Therefore, the alignment division between these reflective display regions R is implemented, and the alignment division in the transmissive display region T is also implemented within a dot, thereby creating a display with wide viewing angle.

Figure 12B:
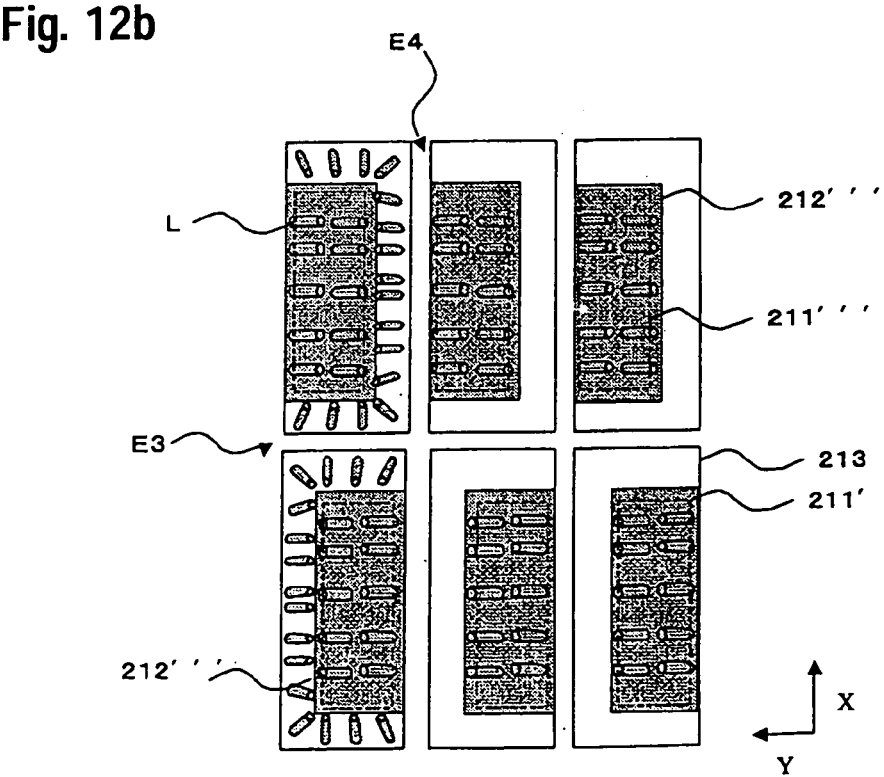

Also, FIG. 12b shows that, the arranging relationship between the transmissive display region T and the reflective display region R is the same between the dot regions adjacent in the Y-direction. But this relationship is inverse between the dot regions adjacent in the Y-direction. Therefore, the alignment division of the liquid crystal can be implemented within the two dot regions (within a single group region formed of these dot regions) adjacent in the Y-direction, the region E4 being therebetween.

The third modification of the second exemplary embodiment will be explained below referring to FIG. 13. FIG. 13 is a plan view showing the alignment state of the liquid crystal of a modification of the second exemplary embodiment of the present invention, which corresponds to FIG. 10.

Figure 13A:
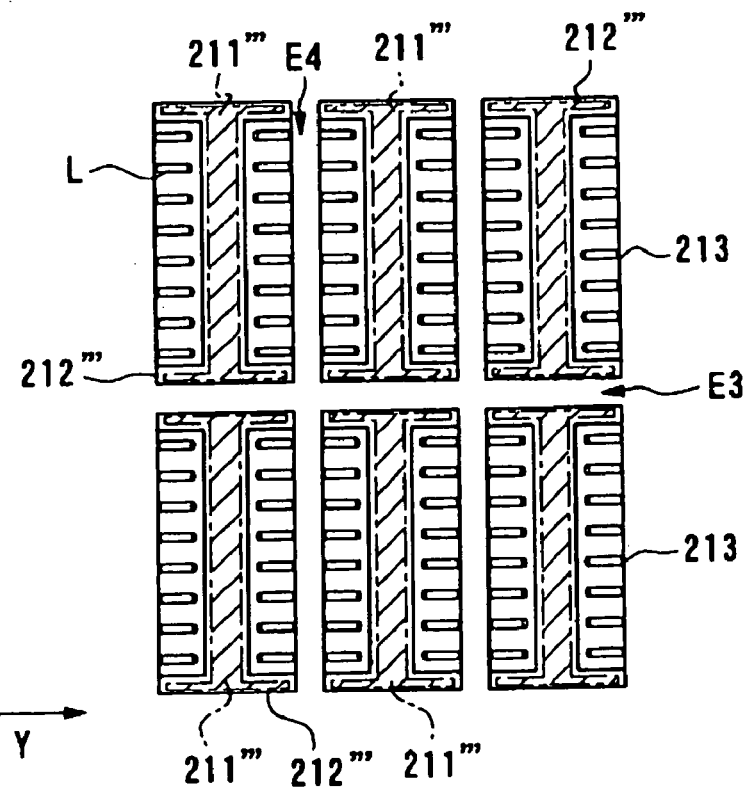
FIGS. 13a and 13b are schematics showing the alignment state of the liquid crystal of a modification of the second exemplary embodiment of the present invention.

As shown in FIG. 13a, the present modification shows that, the reflective display region R is provided at the Y-direction center of the substantially rectangular dot region within a dot region, and the transmissive display region T is provided at two places whose positions are facing the region E4. Specifically, the present modification shows that the transmissive display regions T are provided at two places along the two edges of the dot region facing the region E4, and the reflecting film 211''' is provided at the dot center to form an I-shape in plan view, so that it surrounds the transmissive display regions T. Also, a liquid crystal layer thickness-adjusting layer 212''' is formed thereon.

The others are the same as the second exemplary embodiment.

The configuration shows that the alignment division is implemented as two domains are formed within a dot region, the two domains liquid crystals having different tilts. Therefore, the present modification creates a display with a wider viewing angle than that of the second exemplary embodiment.

Figure 13B:
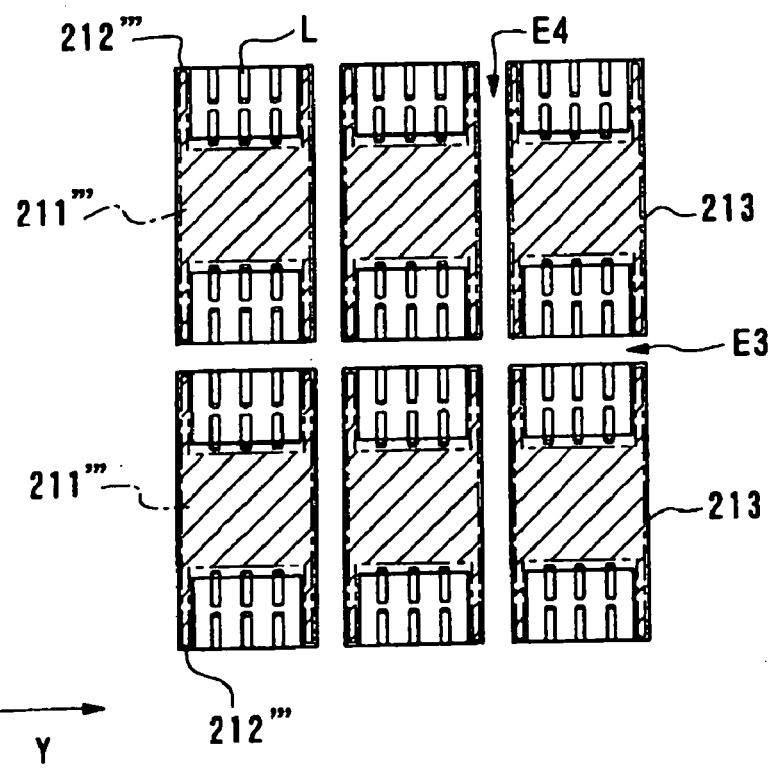

Also, even though the transmissive display region T is arranged at the two edges of the dot region, especially at the positions along the two long sides, in the configuration mentioned above, the transmissive display region T, as shown in FIG. 13b may be arranged along the two short sides of the dot region. But, since the alignment confining force of this configuration becomes smaller than that of FIG. 13a, it may be preferable to provide the transmissive display region T at the edge of the long side from a view of reducing or preventing the alignment disclination.

Figure 14A:
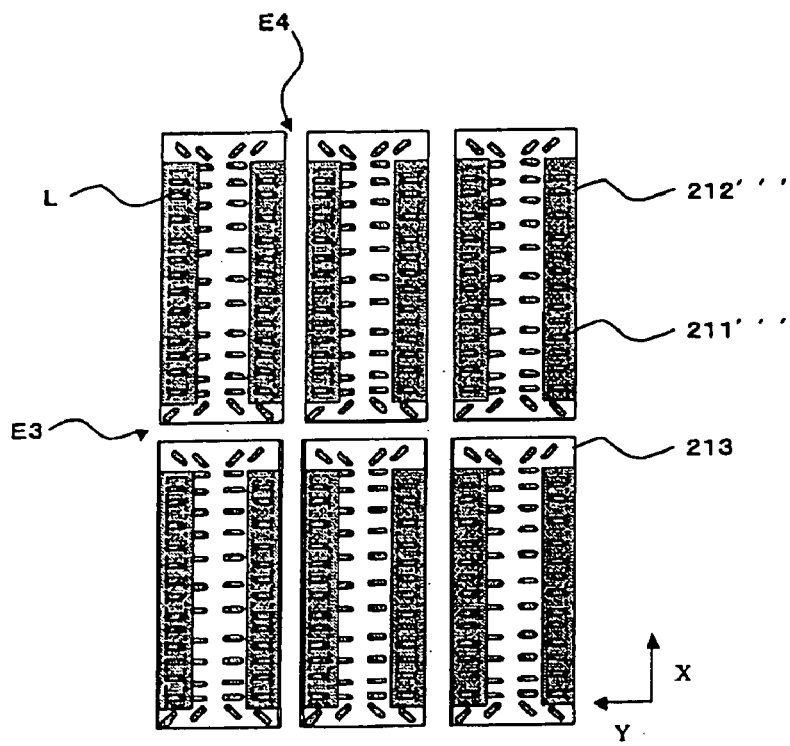
FIGS. 14a and 14b are schematics showing the alignment state of the liquid crystal of a modification of the second exemplary embodiment of the present invention.

As shown in FIG. 14a, the present modification shows that, the transmissive display region T is provided at the Y-direction center of the substantially rectangular dot region within a dot region, and the reflective display region R is provided at two places whose positions are adjacent to the region E4. Specifically, the present modification shows that the reflective display regions R are provided at two places along the two edges of the dot region adjacent to the region E4, the reflecting film 211''' is formed on the reflective region and also a liquid crystal layer thickness-adjusting layer 212''' is formed thereon. Also, the transmissive region T is provided at the dot center to form an I-shape in plan view, so that it surrounds the reflective display regions R.

The others are the same as the second exemplary embodiment.

The configuration shows that, in the reflective region R and the transmissive region T, the alignment division is implemented as two domains are formed within a dot region, the two domains liquid crystals having different tilts. Therefore, the present modification can obtain a display with a wider viewing angle than that of the second exemplary embodiment.

Figure 14B:
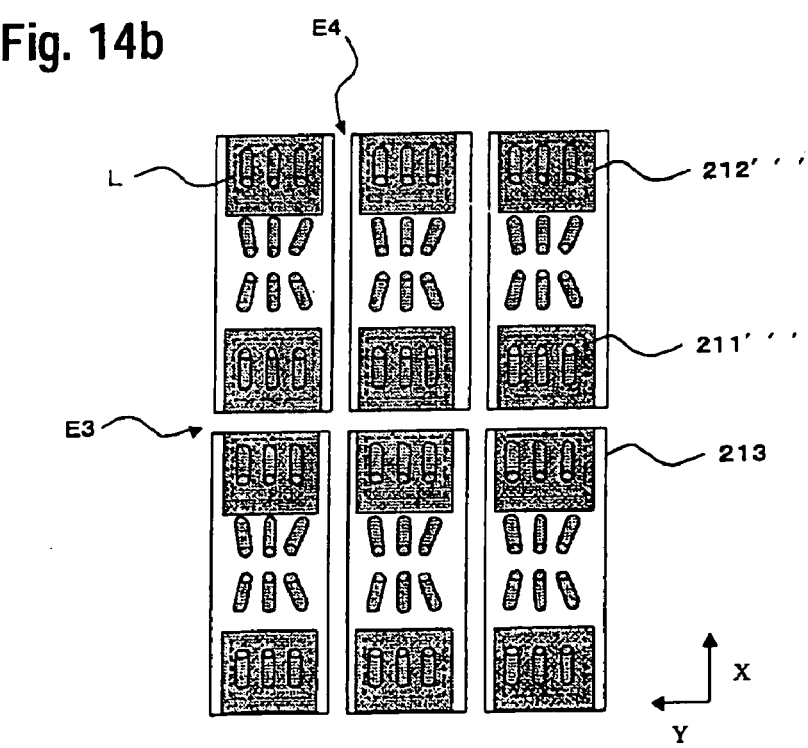

Also, even though the reflective display region R is arranged at the two edges of the dot region, especially at the positions along the two long sides, in the configuration mentioned above, the reflective display region R as shown in FIG. 14b may be arranged along the two short sides of the dot region. But, since the alignment confining force of this configuration becomes smaller than that of FIG. 14a, it is preferable to provide the reflective display region R at the edge of the long side from a view of reducing or preventing the alignment disclination.

Figure 15A:
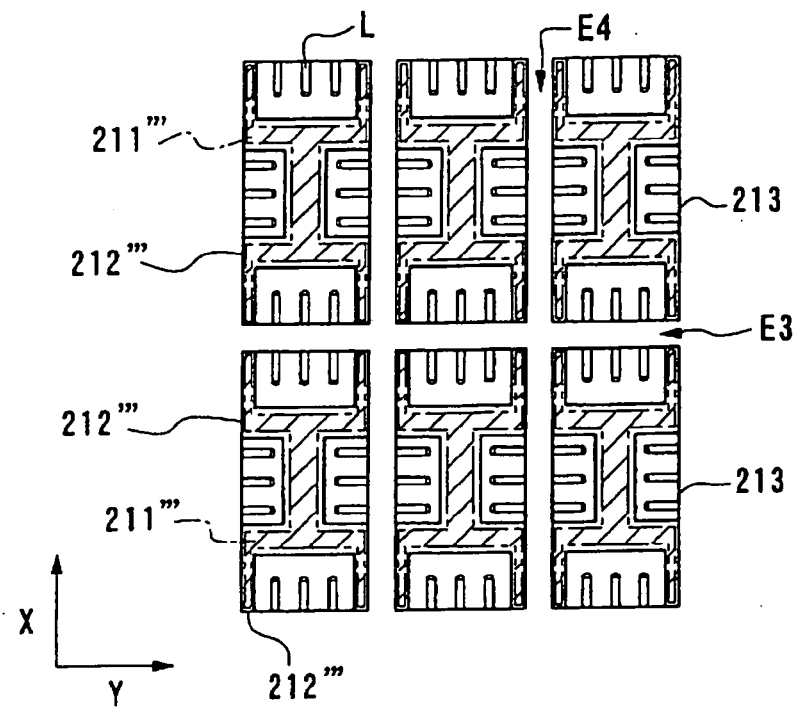
FIGS. 15a and 15b are schematics showing the alignment state of the liquid crystal of the fourth and the fifth modifications, respectively, of the second exemplary embodiment of the present invention.

The fourth modification of the second exemplary embodiment will be explained below referring to FIG. 15a. FIG. 15a is a plan view showing the alignment state of the liquid crystal of a modification of the second embodiment of the present invention, which corresponds to FIG. 10.

The present modification shows that, the reflective display region R is provided at the center of the substantially rectangular dot region within a dot region, and the transmissive display region T is provided at four places being disposed along the four edges of the dot region. Specifically, the present modification shows that, in the four edges of the dot region, the transmissive display regions T are provided at four places at a position facing each of the regions E3 and E4, and the reflecting film 211'''' is provided at the dot center to form an X-shape in plan view, so that it surrounds the transmissive display regions T. Also, a liquid crystal layer thickness-adjusting layer 212'''' is formed thereon.

The others are the same as the second exemplary embodiment.

The configuration shows that the alignment division is implemented as four domains are formed within a dot region, the four domains liquid crystals having different tilts. Therefore, the present modification creates a display with a wider viewing angle than that of the second exemplary embodiment.

Figure 15B:
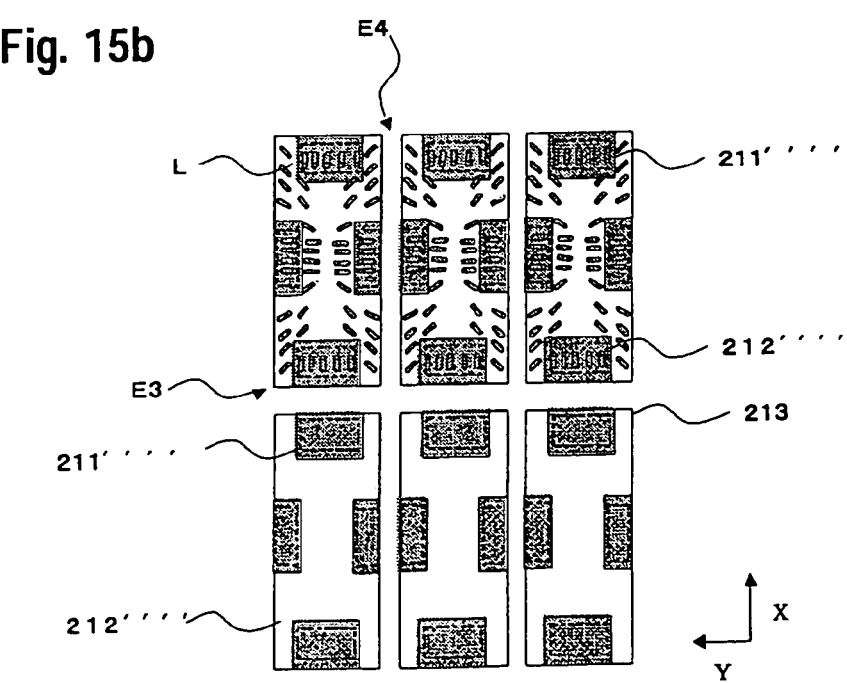

The fifth modification of the second exemplary embodiment will be explained below referring to FIG. 15b. FIG. 15b is a plan view showing the alignment state of the liquid crystal of a modification of the second exemplary embodiment of the present invention, which corresponds to FIG. 10.

The present modification shows that, the transmissive display region T is provided at the center of the substantially rectangular dot region within a dot region. The reflective display region R is provided at four places disposed along the four edges of the dot region. Specifically, the present modification shows that in the four edges of the dot region, the reflective display regions R are provided at four places disposed at a position facing each of the regions E3 and E4. The reflecting film 211'''' is provided within the reflective region R. Also, a liquid crystal layer thickness-adjusting layer 212'''' is formed thereon. The transmissive region T is provided at the dot center to form an X-shape in plan view, so that it surrounds the liquid crystal layer thickness-adjusting layer 212''''.

The others are the same as the second exemplary embodiment.

The configuration shows that the alignment division is implemented as four domains are formed within a dot region, the four domains having the different tilt directions of the liquid crystal. Therefore, the present modification can obtain a display with a wide viewing angle which is larger than that of the second exemplary embodiment.

The sixth modification of the second exemplary embodiment will be explained below referring to FIGS. 16 to 18.

Figure 16:
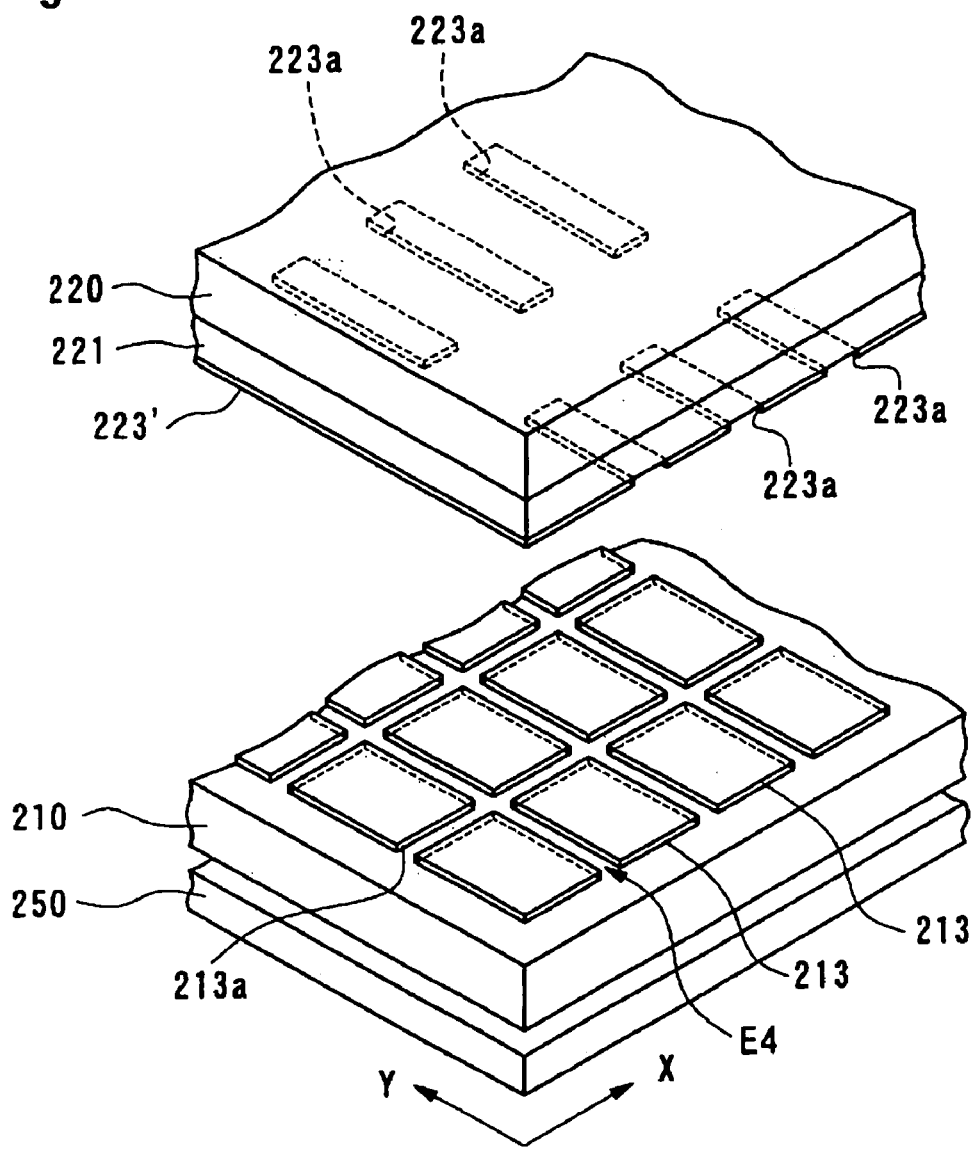
FIG. 16 is a schematic of modification of a liquid crystal display device according to the second exemplary embodiment of the present invention.
Figure 17:
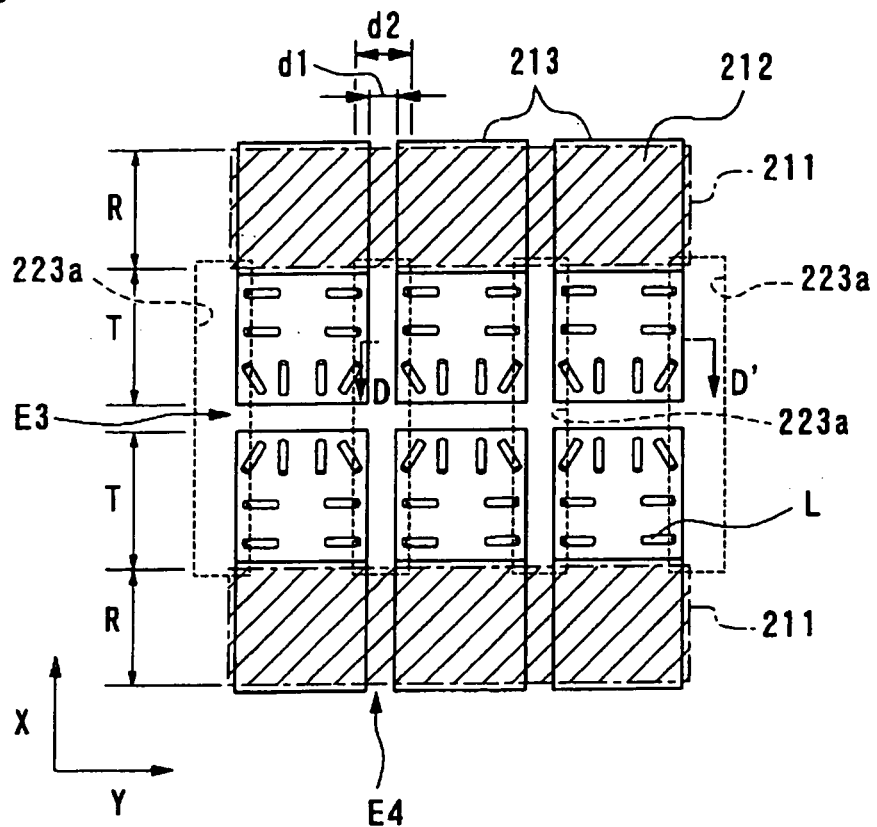
FIG. 17 is a schematic for showing the alignment state of the liquid crystal of the modification of the liquid crystal display device according to the second exemplary embodiment of the present invention.

FIG. 16 is a schematic of the modification of a liquid crystal display device according to the second exemplary embodiment of the present invention. FIG. 17 is a schematic for explaining the alignment state of the liquid crystal, which corresponds to FIG. 10. FIG. 18 is a cross-sectional schematic for explaining the operation thereof, which is a cross-sectional view along plane D–D' of FIG. 17.

The present modification shows that, the alignment control force of the liquid crystal is enhanced if an opening is provided at the common electrode. Specifically, the present modification shows that in the common electrode 223', the opening 223a of a slit is provided at the position facing the region E4 between dots. This opening 223a is provided at a region between the two transmissive display regions T adjacent in the X-direction and primarily functions to control the alignment of the transmissive display. Also the X-direction width d2 of the opening 223a is larger than the width (specifically, the distance between the pixel electrodes in the X-direction) d1 of the region E4 between dots. Also, the opening 223a is arranged in the transmissive display region T such that a part there is folded in a plane to the two transmissive display regions.

Figure 18:
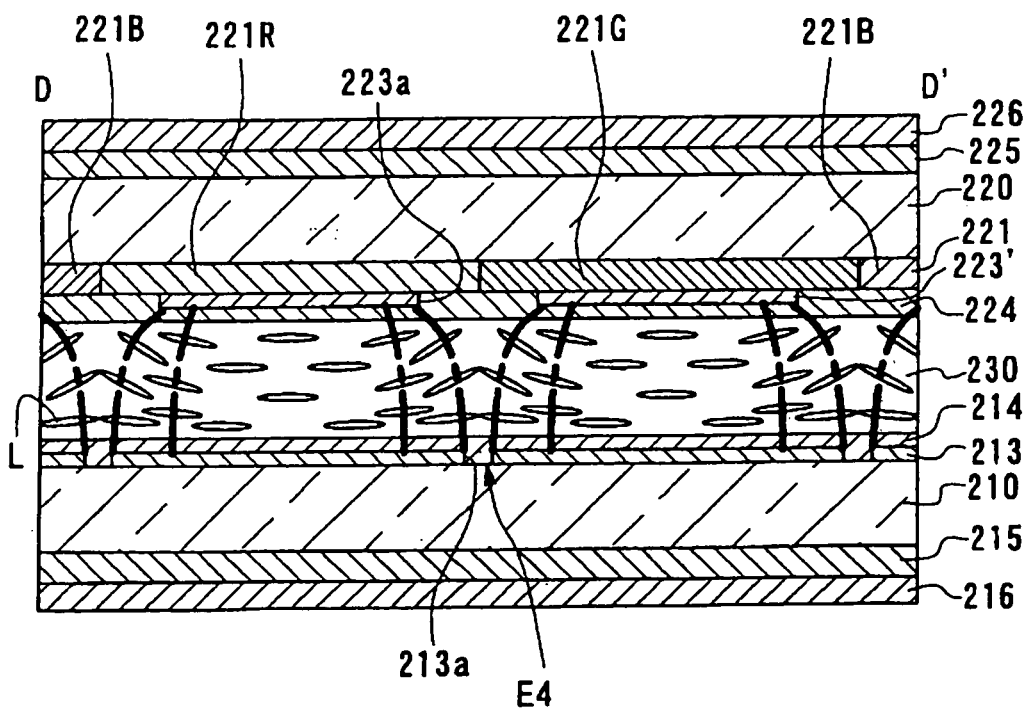
FIG. 18 is a cross-sectional schematic for explaining the operation of the modification of the liquid crystal display device according to the second exemplary embodiment of the present invention.

When a voltage is applied between the electrodes 213 and 223' in this configuration, as shown in FIG. 18, the transverse electric field (which are illustrated by a single dotted line in FIG. 18) are generated from edge 213a of the pixel electrode 213 toward the edge of the openings 223a provided at the common electrode 223' in the region E2. Thereby, the liquid crystal molecules L within the transmissive display region T are aligned obliquely from the dot center toward region E4, the disclination generation region is fixed to the region E4 of non-pixel region.

Therefore, the present modification shows that the alignment control force can be increased as openings 223a are provided at the common electrode 223' and additionally, a relatively bright and clear display can be obtained as the disclination generation region is fixed to the non-pixel region.

Also, like the related art, even if the present modification controls the alignment using the electrode slit (opening 223a), since the opening 223a is formed in the counter substrate in which the step (a liquid crystal layer thickness-adjusting layer) is not arranged, it does not cause problems, such as a disconnection. Also, since the positions of the openings 223a are provided in the non-pixel region, the transmittance ratio is not decreased, either.

Figure 19:
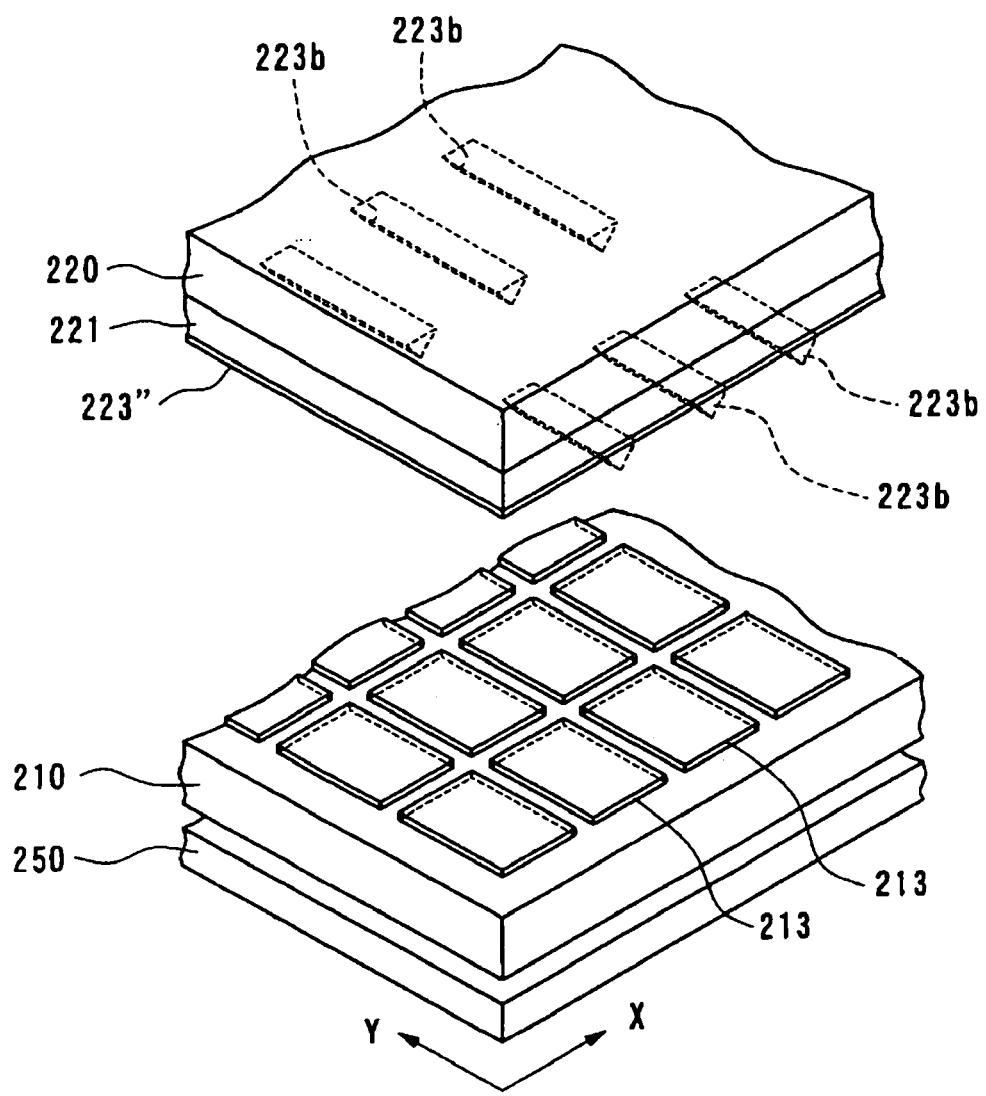
FIG. 19 is a cross-sectional schematic for explaining the operation of the modification of the liquid crystal display device according to the second exemplary embodiment of the present invention.

Also, the opening 223a is provided in the common electrode in the configuration mentioned above, but the protrusion 223b as shown in FIG. 19 may be provided in the position of the opening 223a instead. This configuration can obtain the same effect.

Electronic Apparatus

An electronic apparatus including the liquid crystal display device of the above-mentioned exemplary embodiments according to the present invention will be explained in detail below.

Figure 20:
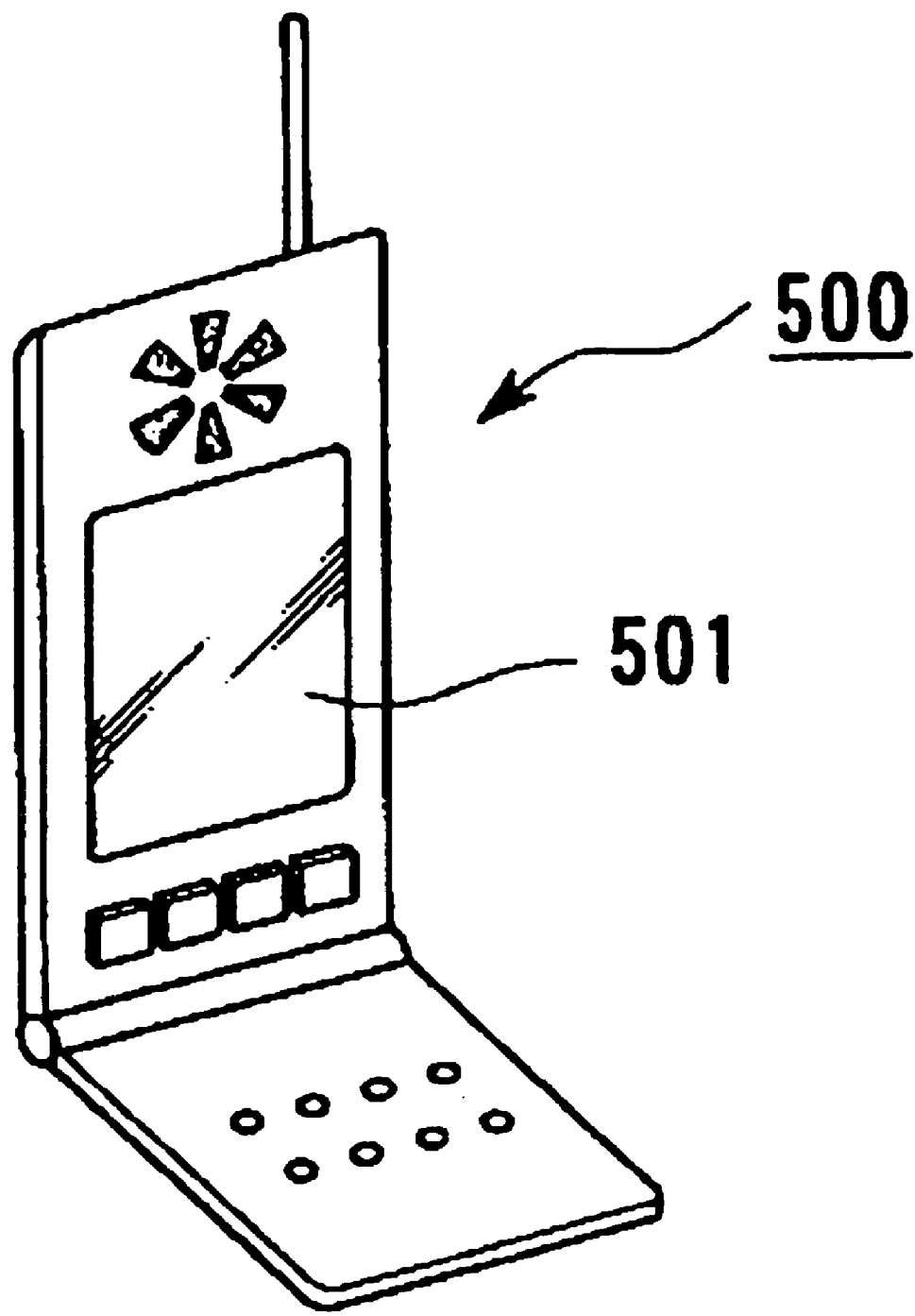
FIG. 20 is a schematic of an example of an electronic apparatus according to the present invention.

FIG. 20 is a schematic perspective view showing an example of a cellular phone. In FIG. 20, reference numeral 500 denotes a main body of the cellular phoneReference numeral 501 denotes a display portion using the liquid crystal display device.

Since the electronic apparatus in FIG. 20 includes the display portion using the liquid crystal display device of the above-mentioned exemplary embodiments, the electronic apparatus has a liquid crystal display with high brightness, high contrast and wide viewing angle, regardless of the environment in which it is used.

Also, the present invention is not limited to the above exemplary embodiments, and a number of modifications may be added within the spirit and scope of the present invention.

For example, the case where the retardation plate is configured as a single plate has been set forth in an exemplary embodiment and the modification thereof but it may also be configured as a laminate of ½ wavelength plate and ¼ wavelength plate. The laminate functions as a broadband circular polarized plate and can change a dark display into one of achromatic color. In addition, a wide viewing angle can be enhanced if a negative C plate is stacked on the laminate. Also, the C plate is a retardation plate with an optical axis in the direction of the film thickness.

Furthermore, the case where the active matrix liquid crystal display device using a TFT as a switching element is applied to the present invention has been set forth in the second exemplary embodiment. But the present invention can be applied to an active matrix liquid crystal display device using a TFD (thin film diode) as a switching element. In addition, a detailed description of the materials, dimensions, shapes and the like, of a variety of components may be changed within an appropriate scope.

What is claimed is:

1. A liquid crystal display device, comprising:
 a first substrate;
 a second substrate;
 a liquid crystal layer sandwiched between the first and second substrates, the liquid crystal layer including liquid crystals having negative dielectric anisotropy;
 at least one first-substrate side electrode between the first substrate and the liquid crystal layer; and
 a first dot region including a first second-substrate side electrode interposed between the second substrate and the liquid crystal layer, a first transmissive display region to perform transmissive display, and a first reflective display region to perform reflective display, the first second-substrate side electrode having an edge, a transverse electric field being generated between the at least one first-substrate side electrode and the edge of the first second-substrate side electrode by application of voltage between the first-substrate side electrode and the first second-substrate side electrode; and
 a second dot region adjacent to the first dot region, the second dot region including a second second-substrate side electrode interposed between the second substrate and the liquid crystal layer, a second transmissive display region to perform transmissive display, and a second reflective display region to perform reflective display, the second second-substrate side electrode being separate and independent from the first second-substrate side electrode, the second second-substrate side electrode having an edge separated from the edge of the first second-substrate side electrode by a gap, a transverse electric field being generated between the first-substrate side electrode and the edge of the second second-substrate side electrode by application of voltage between the first-substrate side electrode and the second second-substrate side electrode, wherein at least one of 1) the first and second transmissive display regions are adjacent to each other or 2) the first and second reflective display regions are adjacent to each other, the liquid crystals of the liquid crystal layer aligning obliquely in reverse directions to each other by the transverse electric fields generated at the edges of the first and second second-substrate side electrodes.

2. The liquid crystal display device according to claim 1 further comprising:

a liquid crystal layer thickness-adjusting layer to control the thickness of the liquid crystal layer so as to be different in the reflective display regions and the transmissive display regions provided at least on the reflective display regions between at least one of the first and second substrates and the liquid crystal layer.

3. The liquid crystal display device according to claim 1, for each of the first and second dot regions, at least one dot region being formed in a substantially rectangular shape, and the transmissive display region associated with the at least one dot region arranged along a long edge of the at least one dot region.

4. The liquid crystal display device according to claim 3, a liquid crystal layer thickness-adjusting layer provided along three edges of the at least one dot region to form a U-shape in plan view, and the transmissive display region associated with the at least one dot region arranged along the other one edge thereof.

5. The liquid crystal display device according to claim 3, the transmissive display region associated with the at least one dot region provided along three edges of the at least one dot region to form a U-shape in plan view, and a liquid crystal layer thickness-adjusting layer arranged along the other one edge thereof.

6. The liquid crystal display device according to claim 3, the transmissive display region associated with the at least one dot region provided at four places being disposed along four edges of the at least one dot region.

7. The liquid crystal display device according to claim 3, a liquid crystal layer thickness-adjusting layer provided at four places being disposed along four edges of the at least one dot region.

8. An electronic apparatus, comprising:

the liquid crystal display device according to claim 1.

* * * * *